US011895655B2

(12) United States Patent
Kwak et al.

(10) Patent No.: US 11,895,655 B2
(45) Date of Patent: Feb. 6, 2024

(54) SIDELINK TRANSMISSION FROM REMOTE USER EQUIPMENT (UE) TO RELAY UE

(71) Applicant: QUALCOMM INCORPORATED, San Diego, CA (US)

(72) Inventors: Yongjun Kwak, San Diego, CA (US); Seyedkianoush Hosseini, San Diego, CA (US); Jing Lei, San Diego, CA (US); Hung Dinh Ly, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/489,377

(22) Filed: Sep. 29, 2021

(65) Prior Publication Data
US 2022/0110107 A1 Apr. 7, 2022

Related U.S. Application Data

(60) Provisional application No. 63/198,210, filed on Oct. 2, 2020.

(51) Int. Cl.
H04W 72/04 (2023.01)
H04W 72/20 (2023.01)
(Continued)

(52) U.S. Cl.
CPC .......... *H04W 72/20* (2023.01); *H04L 1/0003* (2013.01); *H04L 1/1812* (2013.01); *H04W 52/10* (2013.01);
(Continued)

(58) Field of Classification Search
CPC ..... H04W 72/20; H04W 72/02; H04W 52/10; H04W 16/14; H04W 88/04;
(Continued)

(56) References Cited

U.S. PATENT DOCUMENTS

2018/0376525 A1* 12/2018 Feng ............... H04W 76/11
2020/0389900 A1* 12/2020 Lee ................. H04W 72/53
(Continued)

FOREIGN PATENT DOCUMENTS

EP 3267748 A1 1/2018
WO 2019028847 A1 2/2019

OTHER PUBLICATIONS

Alcatel-Lucent Shanghai Bell, et al.,"L3-Based UE-to-Network Relays", 3GPP Draft, R1-152668, 3GPP TSG RAN WG1 Meeting #81, L3-Based UE-to-Network Relays_Final, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015 (May 24, 2015), XP050972668, 5 Pages, Retrieved from the Internet: URL:http://www.3gpp.org/ftp/Meetings_3GPP_SYNC/RAN1/Docs/ [retrieved on May 24, 2015] Scheme 1, Scheme 2, p. 2.

(Continued)

Primary Examiner — Mahbubul Bar Chowdhury
(74) Attorney, Agent, or Firm — Arun Swain

(57) ABSTRACT

Wireless communications systems and methods related to reverse link operations in sidelink communications are provided. A first user equipment (UE) receive, from a second UE, sidelink resource pool information. The first UE may select, based on the sidelink resource pool information, a first resource from a set of resources in a sidelink resource (Continued)

pool, and transmit, to the second UE based on the sidelink resource pool information, a first sidelink transmission using the first resource.

24 Claims, 11 Drawing Sheets

(51) Int. Cl.
| | |
|---|---|
| *H04L 1/1812* | (2023.01) |
| *H04L 1/00* | (2006.01) |
| *H04W 52/10* | (2009.01) |
| *H04W 72/02* | (2009.01) |
| *H04W 88/04* | (2009.01) |
| *H04W 16/14* | (2009.01) |

(52) U.S. Cl.
CPC ............ *H04W 72/02* (2013.01); *H04W 16/14* (2013.01); *H04W 88/04* (2013.01)

(58) Field of Classification Search
CPC . H04W 52/242; H04W 52/383; H04W 72/23; H04W 76/14; H04W 92/18; H04L 1/0003; H04L 1/1812; H04L 1/0007; H04L 1/0009; H04L 1/0025; H04L 1/1819; H04L 1/1822; H04L 1/1893; H04L 1/1864
See application file for complete search history.

(56) References Cited

U.S. PATENT DOCUMENTS

| | | | | |
|---|---|---|---|---|
| 2022/0070850 | A1* | 3/2022 | Hosseini | H04L 5/0094 |
| 2022/0078693 | A1* | 3/2022 | Ly | H04W 36/30 |
| 2022/0110141 | A1* | 4/2022 | Kwak | H04W 76/28 |
| 2022/0353948 | A1* | 11/2022 | Luo | H04W 76/28 |
| 2023/0087401 | A1* | 3/2023 | Shin | H04L 5/0037 |

OTHER PUBLICATIONS

Coolpad: "Further Discussion on Resource Allocation Issues and Way Forward for Release 13", 3GPP Draft, 3GPP TSG RAN WG2 #91bis, R2-154269, 3rd Generation Partnership Project (3GPP), Mobile Competence Centre, 650, Route Des Lucioles, F-06921 Sophia-Antipolis Cedex, France, vol. RAN WG2, No. Malmo, Sweden, Oct. 5, 2015-Oct. 10, 2015 Oct. 4, 2015 (Oct. 4, 2015), XP051004828, pp. 1-4, Retrieved from the Internet: URL:http://www.3gpp.org/ftp/Meetings_3GPP_SYNC/RAN2/Docs/ [retrieved on Oct. 4, 2015], paragraph [03.3], p. 2, paragraph 3.1, p. 2, figure 2.

International Search Report and Written Opinion—PCT/US2021/053035—ISA/EPO—dated Jan. 20, 2022.

LG Electronics: "Discussion on Sidelink Resource Allocation and Configuration for FeD2D", 3GPP Draft, R1-1713116, 3GPP TSG RAN WG1 Meeting #90, Discussion on Sidelink Resource Allocation and Configuration for FeD2D_LG, 3rd Generation Partnership Project (3GPP), Mobile Competence Centre, 650, Route Des Lucioles, F-06921 Sophia-Antipolis Cedex, vol. RAN WG1, No. Prague, Czech Republic, Aug. 21, 2017-Aug. 25, 2017, Aug. 20, 2017 (Aug. 20, 2017) XP051315925, pp. 1-3, Retrieved from the Internet: URL:http://www.3gpp.org/ftp/Meetings_3GPP_SYNC/RAN1/Docs/ [retrieved on Aug. 20, 2017] p. 2, line 2, paragraph 2.3—line 4 p. 3, line 1, paragraph 2.4—line 6.

ZTE: "FeD2D Resource Scheme", 3GPP Draft, 3GPP TSG RAN WG1 Meeting #89, R1-1707209-6.2.9.2.3.2 Resource Scheme of FED2D Relay, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), XP051272424, 4 Pages, Retrieved from the Internet: URL:http://www.3gpp.org/ftp/Meetings_3GPP_SYNC/RAN1/Docs/ [retrieved on May 14, 2017] p. 3, paragraph 2.4.

ZTE: "Resource Scheme for UE-to-Network Relay UE and Remote UE", 3GPP Draft, R1-154050, 3GPP TSG-RAN WG1 Meeting #82, Resource for Network-to-UE Relay, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), XP051001441, 6 pages, Retrieved from the Internet: URL:http://www.3gpp.org/ftp/Meetings_3GPP_SYNC/RAN1/Docs/ [retrieved on Aug. 23, 2015] p. 4, line 8-line 12.

* cited by examiner

SIDELINK TRANSMISSION FROM REMOTE USER EQUIPMENT (UE) TO RELAY UE

CROSS-REFERENCE TO RELATED APPLICATIONS

This present application claims the benefit of, and priority to, U.S. Provisional Patent Application No. 63/198,210, filed Oct. 2, 2020, the entirety of which is incorporated by reference herein.

TECHNICAL FIELD

This present disclosure is directed to wireless communication systems and methods. Certain embodiments can enable and provide techniques for sidelink transmissions from a remote user equipment (UE) to a relay UE.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), includes receiving, from a second UE, sidelink resource pool information; selecting, based on the sidelink resource pool information, a first resource from a set of resources in a sidelink resource pool; and transmitting, to the second UE based on the sidelink resource pool information, a first sidelink transmission using the first resource.

In additional aspect of the disclosure, a method of wireless communication performed by a first user equipment (UE), includes transmitting, to a second UE, sidelink resource pool information; and transmitting, to the second UE based on the sidelink resource pool information, a first sidelink transmission using the first resource.

In additional aspect of the disclosure, a first user equipment (UE) includes a processor configured to select, based on sidelink resource pool information, a first resource from a set of resources in a sidelink resource pool; and a transceiver configured to receive, from a second UE, the sidelink resource pool information; and transmit, to the second UE based on the sidelink resource pool information, a first sidelink transmission using the first resource.

In additional aspect of the disclosure, a first user equipment includes a transceiver configured to transmit, to a second UE, the sidelink resource pool information; and receive, from the second UE based on the sidelink resource pool information, a first sidelink transmission using the first resource.

In additional aspects of the disclosure, a non-transitory computer readable medium having program code recorded on, the program code comprising a code for causing a first UE to receive, from a second UE, sidelink resource pool information; code for causing the first UE to select, based on the sidelink resource pool information, a first resource from a set of resources in a sidelink resource pool; and code for causing the first UE to transmit, to the second UE based on the sidelink resource pool information, a first sidelink transmission using the first resource.

In additional aspects of the disclosure, a non-transitory computer readable medium having program code recorded on, the program code comprising a code for causing a first UE to transmit, to a second UE, sidelink resource pool information; and code for causing the first UE to receive, from the second UE based on the sidelink resource pool information, a first sidelink transmission using the first resource.

In additional aspects of the disclosure, a first user equipment (UE) includes means for receiving, from a second UE, sidelink resource pool information; means for selecting, based on the sidelink resource pool information, a first resource from a set of resources in a sidelink resource pool; and means for transmitting, to the second UE based on the sidelink resource pool information, a first sidelink transmission using the first resource.

In additional aspects of the disclosure, a first user equipment (UE) includes means for transmitting, to a second UE, sidelink resource pool information; and means for receiving, from the second UE based on the sidelink resource pool information, a first sidelink transmission using the first resource.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
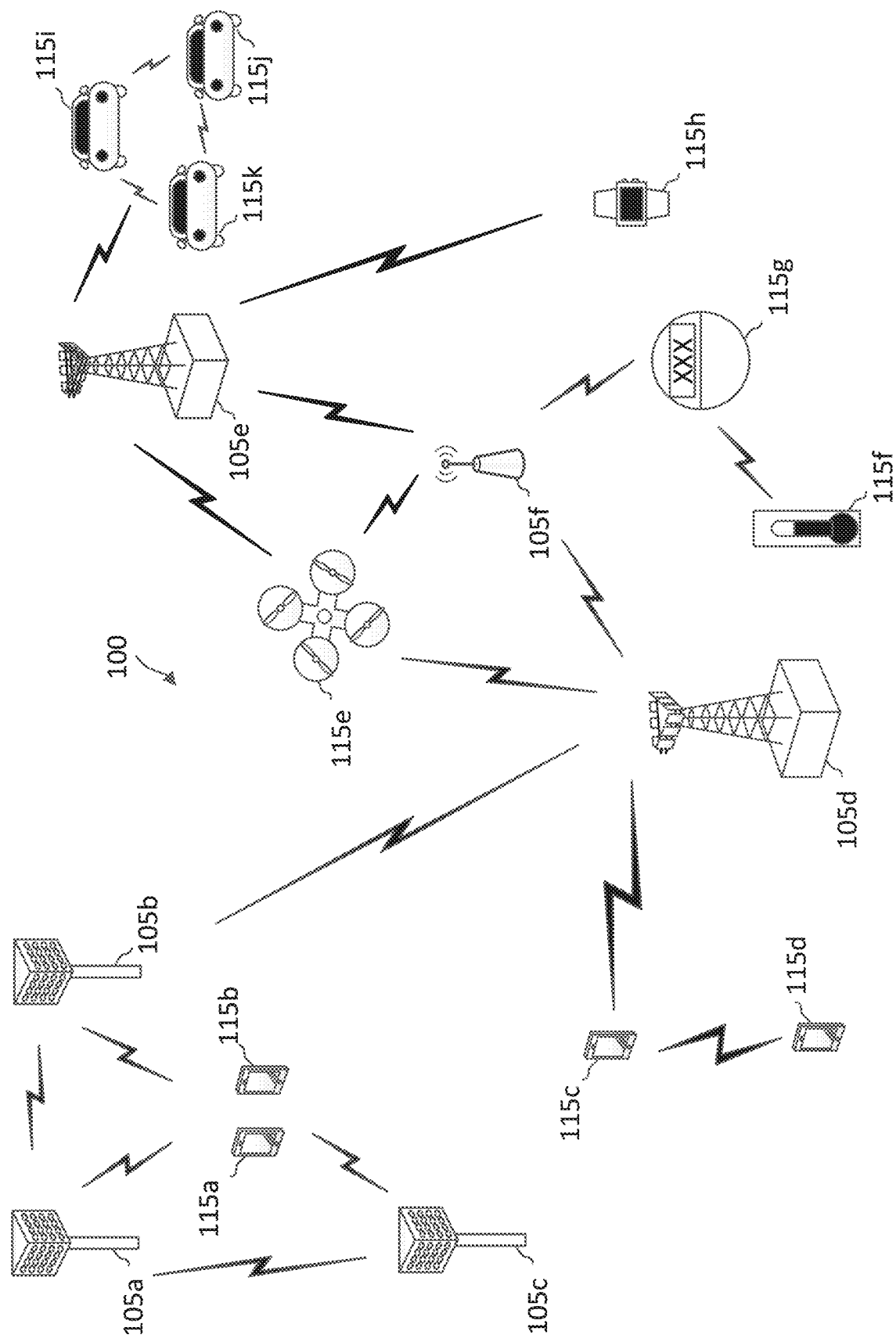
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), NR-lite, and/or NR-super-lite. NR-lite may refer to a reduced-version of NR in terms of UE power consumptions, capabilities, and/or cost. NR-super-lite may refer to a further reduced-version of NR in terms of UE power consumptions, capabilities, and/or cost.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. As used herein, the terms "sync UE", "sidelink sync UE", "anchor UE", or "sidelink anchor UE" refer to a sidelink UE transmitting an S-SSB to facilitate sidelink communications among multiple sidelink UEs (e.g., when operating in a standalone sidelink system), and the terms are interchangeable without departing from the scope of the present disclosure. As used herein, the terms "relay UE" or "sidelink relay" refers to a UE within the coverage of a BS functioning as a relay node between the BS and another UE. As used herein, the term "remote UE" refers to a UE communicating with a BS via a relay UE. A sidelink UE may operate as a transmitting sidelink UE at one time and as a receiving sidelink UE at another time. A sidelink sync UE, a relay UE, or a remote UE may also operate as a transmitting sidelink UE at one time and operate as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A serving BS may also configure a sidelink UE to operate as a sidelink anchor UE to provide sidelink system information for out-of-coverage sidelink UEs to communicate sidelink communications. For instance, a sidelink anchor UE may provide sidelink system information by broadcasting sidelink-synchronization signal block (S-SSB). The S-SSB may be analogous to the SSB broadcast by a BS. For instance, an S-SSB may include synchronization signals and/or sidelink system information. Some examples of sidelink system information may include a sidelink bandwidth part (BWP) configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some implementations, an anchor UE may also schedule other sidelink UEs for communications. Thus, a sidelink anchor UE may operate as a mini-gNB facilitating and/or coordinating communications among sidelink UEs over. A sidelink channel where two UEs may communicate with each other directly may also be referred to as a PC5 interface.

The advancement in wireless communication technologies such as NR, had been mostly focused on delivering high-end services (e.g., eMBB) to premium smartphones, which may have high processing and/or power capabilities, and/or services (e.g., URLLC and V2X) for vertical industries. To address scalability, NR-lite had been introduced to enable a more efficient and cost-effective deployment, for example, by relaxing (lowering) the peak data throughput, latency, and/or reliability. Thus, NR-lite may be more suitable for serving mid-end UEs that that may have lower capabilities than the premium UEs. As use cases and diverse deployment scenarios continue to expand in wireless communication, further complexity and/or power consumption reduction may enable the support of low power wide area (LPWA) deployments. For instance, NR-super-lite with further reduced capabilities may support low-end UEs that may have lower capabilities than the mid-end UEs. Some example use cases for NR-super-lite may include delivery of services related to smart metering, asset tracking, and/or personal IoT applications (e.g., health monitoring). Accordingly, there is a need to improve coverage, complexity, and/or power consumption.

In some aspects, a network may utilize sidelink to improve coverage, power consumption and/or complexity for low-end UEs. For example, in some use cases, the sidelink transmission may support UE-to-network relay, in which an in-coverage UE is able to relay signals between a gNB and an out-of-coverage UE (remote UE). Using the relay UE to relay communications between the gNB and the remote UE can improve power efficiencies by avoiding a large number of radio signal repetitions (e.g., up to 2048 repetitions) that may otherwise be required to extend coverage. In some instances, the remote UE may measure the received-signal-indicator (RSSI) level from the gNB, and if the RSSI is below a pre-defined threshold, the remote UE may connect to the in-coverage relay UE. Subsequently, the in-coverage relay UE may receive data and control signaling from the gNB, boost signal power, and transmit them to the sidelink remote UE. In some instances, the remote out-of-coverage UE may be in the same cell as the sidelink relay UE. In some other instances, the remote UE may be in a different cell than the sidelink relay UE.

In some use cases, the sidelink transmission may be utilized to support short distance communications such as wearable or in home new wearable. For example, in short distance sidelink communications, a sidelink UE (a relay) may be utilized to support relaying signals from a gNB to several low power wearable devices. Additionally, in some uses cases, the sidelink relay may be utilized to support a low power operational mode in some technologies such as vehicle-to-everything (V2X) systems. V2X systems enables vehicles to communicate with the traffic and environment around then using short distance communications. The side link relay, may be utilized in V2X system to reduce power consumption of the communication devices connected to an sidelink relay.

In some aspects, a sidelink UE may support half-duplex communications. In other words, the sidelink UE may perform transmission or reception at any given time, but not both transmission and reception at the same time. Thus, the total amount of resources in a sidelink resource pool is shared between transmission and reception. One issue with half-duplex communication is that when a sidelink UE is transmitting in a sidelink resource, the sidelink UE may not be able to monitor other sidelink resources at the same time. As such, if another sidelink UE transmits SCI in one of the other resources indicating a reservation for a future sidelink resource, the UE may not detect the SCI, and thus may not be aware of the reservation. If the UE determines to transmit in the reserved sidelink resource, the UE can cause a collision or interference and impact sidelink performance.

The present application describes mechanisms for allocation of resources in a reverse link for sidelink communications to support half-duplex transmission and lower power operations. A forward link may refer to a sidelink in a transmission direction from a relay UE to a remote UE. A reverse link may refer to a sidelink in a transmission direction from a remote UE to a relay UE. For example, a remote UE may be preconfigured with a sidelink resource pool for reverse link transmissions, and a relay UE may transmit sidelink resource pool information to the remote UE to control resource usages in the sidelink resource pool. For instance, the sidelink resource pool may include a set of resources that may be used for sidelink transmission by the remote UE over the reverse link. The sidelink resource pool information can include a variety of parameters that can control how the remote UE may select a resource from the set of resources for a reverse link transmission.

In some aspects, the sidelink resource pool information may include a transport block size (TBS), a resource utilization parameter, a modulation coding scheme (MSC), a channel busy ratio (CBR), a frequency hopping pattern, and/or power control parameter(s). In some aspects, the TBS may be a maximum TBS of a data block or transport block that the remote UE may transmit to the relay UE. The resource utilization parameter may indicate a maximum amount of resources that the remote UE may use from the sidelink resource pool for reverse link transmissions (e.g., over a certain time period). The MCS may be a maximum MCS order that the remote UE may use for encoding a data block for transmission to the relay UE. The CBR may limit resource usages in the sidelink resource pool by the remote UE based on an occupancy of the sidelink resource pool. The frequency-hopping pattern may determine which of the frequency subbands in the sidelink resource pool the remote UE may use when the remote UE selects a sequence of resources (e.g., for initial transmission and retransmission(s)). In some aspects, the frequency-hopping pattern can be specific to the remote, for example, based on the UE ID of the remote UE. The power control parameter(s) may control the transmission power that the remote UE may use for a reverse link transmission to the relay UE.

Accordingly, the remote UE may receive the sidelink resource pool information from the relay UE. The remote UE may select a first resource from the set of sidelink resources in the sidelink resource pool based on the received sidelink resource pool information. The remote UE may transmit data and control signaling to the relay UE over the reverse link using the first resource.

In some aspects, the remote UE may select the first resource from the set of resources further based on a random number and may further select one or more resources from the set of resources (e.g., associated with a retransmission) according the frequency hopping pattern. Accordingly, the relay UE may perform SCI monitoring in the set of resources and receive the data and control signaling from the remote UE in the first resource. In some other aspects, the remote UE may select the first resource from the set of resources further based on a UE identifier (ID) of the remote UE and may further select one or more resources from the set of resources (e.g., associated with a retransmission) according to the frequency hopping pattern.

Aspects of the present disclosure can provide several benefits. For example, where the relay UE is an advanced UE (e.g., a high-end or mid-end UE) and the remote UE is an NR superlight UE, the reverse link resource allocation and resource usage control technique can provide low-complexity resource selection mechanisms, and thereby allow for power-efficient sidelink operations. Additionally, the reverse link resource allocation presented in this disclosure can provides a low power operation mode for a V2X system. Further, performing reverse link resource allocation resolves half-duplex data transmission issues, and hence increasing the sidelink data rates and power efficiency. In half-duplex communication, only one UE (e.g., remote or relay) can transmit or receive at a time.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Figure 2:
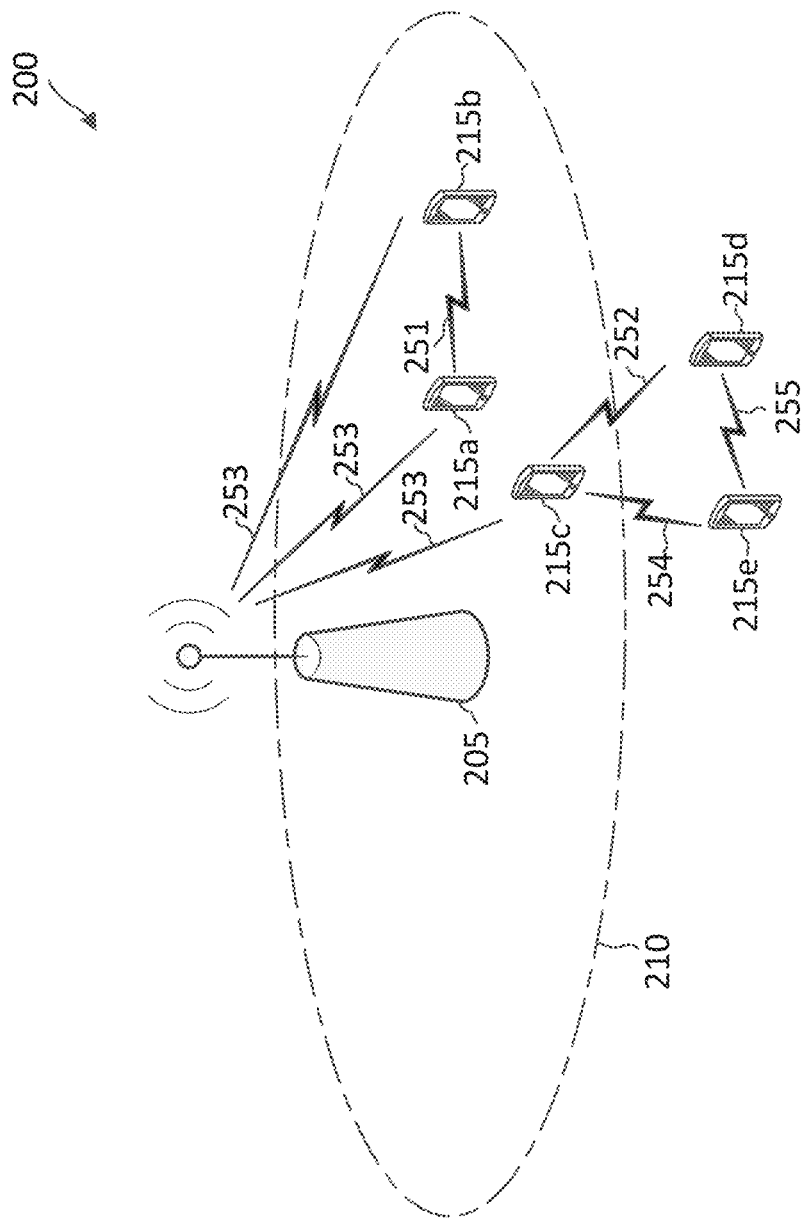
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages.

In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a BS 105 may configure a UE 115 to operate as a sidelink sync or anchor UE 115 to provide sidelink system information for other sidelink UEs 115, which may be out of the coverage of the BS 105, to communicate sidelink communications. The sidelink sync UE 115 may transmit the sidelink system information in the form of S-SSBs. An S-SSB may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some aspects, the BS 105 may configure the sidelink sync UE 115 transmit the S-SSB according to a synchronization raster defined for NR-U. In some instances, the S-SSB according to the NR-U synchronization raster may be offset from a lowest frequency of a corresponding sidelink BWP where the S-SSB is transmitted. In some other aspects, the BS 105 may transmit the S-SSB according to a synchronization raster defined for sidelink. The sidelink synchronization raster can be defined such that the S-SSB may be aligned to a lowest frequency of a corresponding sidelink BWP where the S-SSB is transmitted.

In some aspects, a UE 115 may operate as a relay sidelink UE 115 based on a pre-configuration or a configuration received from a BS 105. The relay sidelink UE 115 may communicate with at least one remote UE 115. The relay UE 115 may relay signals between the remote UE 115 and the BS 105. According to aspects of the present disclosure, the relay UE 115 may transmit sidelink resource pool information associate with a sidelink resource pool to a remote UE 115, for example for improving power efficiency. In some aspects, a BS 105 may provide the total resource pool to the relay sidelink UE 115, and the relay sidelink UE 115 may determine a set of resources from the total resource pool for reverse link transmissions from a remote sidelink UE 115 to the relay sidelink UE 115. The remote sidelink UE 115 may transmit sidelink data and control signaling (e.g., scheduling information, SCI) to the relay sidelink UE 115 using resource(s) from the first set of resources. Each sidelink resource may include a PSCCH and a PSSCH. For instance, the remote sidelink UE 115 may transmit data over a PSSCH of a resource, and control signaling over a PSCCH of the resource. Furthermore, the relay sidelink UE 115 may receive sidelink data and control signaling (e.g., scheduling information, SCI) from the remote sidelink relay UE 115 in the set of resource.

According to some aspects of the present disclosure, the remote sidelink UE 115 may select a first resource from the set of resources in the sidelink resource pool based on a random number. The relay sidelink UE 114 may transmit to the remote sidelink UE 115, sidelink resource pool information including transport block size (TBS), modulation and coding scheme (MCS), power control parameter, channel busy ratio (CBR), frequency hopping pattern, etc. The sidelink resource pool information can control and/or facilitate sidelink resource selection at the remote sidelink UE 115. In this regard, the remote sidelink UE 115 may select resource(s) from the set of resources based on the resource pool information received from the relay sidelink UE and transmit data and control signaling to the relay sidelink UE 115 in the selected resource(s).

According to some aspects of the present disclosure, the remote sidelink UE 115 may select a first resource from the set of resources based on a UE ID of the remote sidelink UE 115. For instance, the relay sidelink UE 115 may transmit to the remote sidelink UE 115, sidelink resource pool information including transport block size (TBS), modulation and coding scheme (MCS), power control parameter, channel busy ratio (CBR), frequency hopping pattern, etc. The sidelink resource pool information can control and/or facilitate sidelink resource selection at the remote sidelink UE 115. In this regard, the remote sidelink UE may select resource(s) from the set of resources based on its UE ID and the resource pool information. The remote sidelink UE 115 may transmit data and control signaling to the relay sidelink UE 115 in the selected resource(s).

FIG. 2 illustrates an example of a wireless communication network 200 that provisions for sidelink communications according to embodiments of the present disclosure. The network 200 may correspond to a portion of the network 100. FIG. 2 illustrates one BSs 205 and five UEs 215 (shown as 215*a*, 215*b*, 215*c*, 215*d*, and 215*e*) for purposes of simplicity of discussion, though it will be recognized that embodiments of the present disclosure may scale to any suitable number of UEs 215 (e.g., the about 2, 3, 4, 6, 7 or more) and/or BSs 205 (e.g., the about 2, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

In the network 200, some of the UEs 215*a*-215*e* may communicate with each other in peer-to-peer communications. For example, the UE 215*c* may communicate with the UE 215*e* over a sidelink 254, and may communicate to UE 215*d* over yet another sidelink 252. The sidelinks 252, and 254 are unicast bidirectional links. Some of the UEs 215 may also communicate with the BS 205 in a UL direction and/or a DL direction via communication links 253. For instance, the UE 215*a*, 215*b*, are within a coverage area 210 of the BS 205, and thus may be in communication with the BS 205. In some instances, the UE 215*c* may operate as a relay for the UE 215*e*,215*d* to reach the BS 205. In some aspects, some of the UEs 215 are associated with vehicles (e.g., similar to the UEs 115*i-k*) and the communications over the sidelinks 252, and 254 may be C-V2X communications. C-V2X communications may refer to communications between vehicles and any other wireless communication devices in a cellular network. In some aspects, some of the UEs 215 are IoT devices such as metering devices, asset tracking devices, health monitoring devices, personal wearable devices and the communications over the sidelinks 252, and 254 may be IoT data associated with corresponding services or applications.

In some aspects, the UE 215*e* may serve as a sidelink anchor UE and UE 215*c* may serve as a sidelink receiving UE, where UE 215*e* transmits system parameter information including timing synchronization signals over a sidelink broadcast channel (e.g., PSBCH) such that the UE 215*c* can receive and recover resource allocation and timing information to facilitate a sidelink communication with the UE 215*e*. For purposes of explanation and brevity of discussion, the remaining description for FIG. 2 will be discussed in reference to UE 215*c* (e.g., sidelink receiving UE) and UE 215*e* (e.g., sidelink anchor UE).

Sidelink discovery of other sidelink transmitting UEs, such as other anchor nodes, can be facilitated through the use of a transport channel referred to as a transport sidelink discovery channel (SL-DCH), and its physical counterpart, the physical sidelink discovery channel (e.g., PSDCH). In some aspects, a sidelink transmitting UE can transmit one or more announcement messages that are generated using physical layer transport blocks with zero media access control overhead. For example, the UE 215*e* can broadcast an announcement message over the PSDCH to announce its status as an anchor node.

In various embodiments, the sidelink anchor UE may utilize the sidelink discovery procedure to: 1) announce its presence as the anchor UE to potentially proximal sidelink UEs by transmitting a message containing its application information or other useful information fields (e.g., GPS coordinates, time, and the like), and 2) monitor the presence of other proximal sidelink UEs by detecting and decoding the corresponding discovery messages, and respond to the sidelink transmitting UEs using similar discovery messages. In some instances, the discovery message may include information about the type of discovery being performed and/or the type of content (e.g., announcement, query) provided by the sidelink transmitting UE. For example, the UE 215*e* may broadcast a discovery message over the PSDCH, in which the discovery message includes an indication that the discovery message pertains to an announcement of its anchor node status.

In some aspects, UE 215*e* may perform a sensing operation on one or more of a discovery channel, such as the PSDCH, or a sidelink broadcast channel, such as the PSBCH, depending on implementation. If the UE 215*e* does not detect an existing anchor UE on the discovery channel, then the UE 215*e* may configure itself as an anchor UE and broadcast an announcement indicating itself to be the anchor UE. If the UE 215*e* detects an existing anchor UE, the UE 215*e* may determine whether there is a need for it to become an anchor node within the wireless communication network 200.

In some aspects, the UE 215*e* may provide a transmission resource pool configuration that includes configuration information for a discovery resource pool configuration and a control/data communication resource pool configuration. Sidelink receiving UEs (e.g., UE 215*c*) may monitor multiple resources to listen for discovery announcements communicated by anchor UEs (e.g., UE 215*e*) to minimize and/or avoid sidelink UE interference. At the end of a discovery procedure, the UE 215*e* and the UE 215*c* may establish a communication link for sidelink communication.

Figure 3:
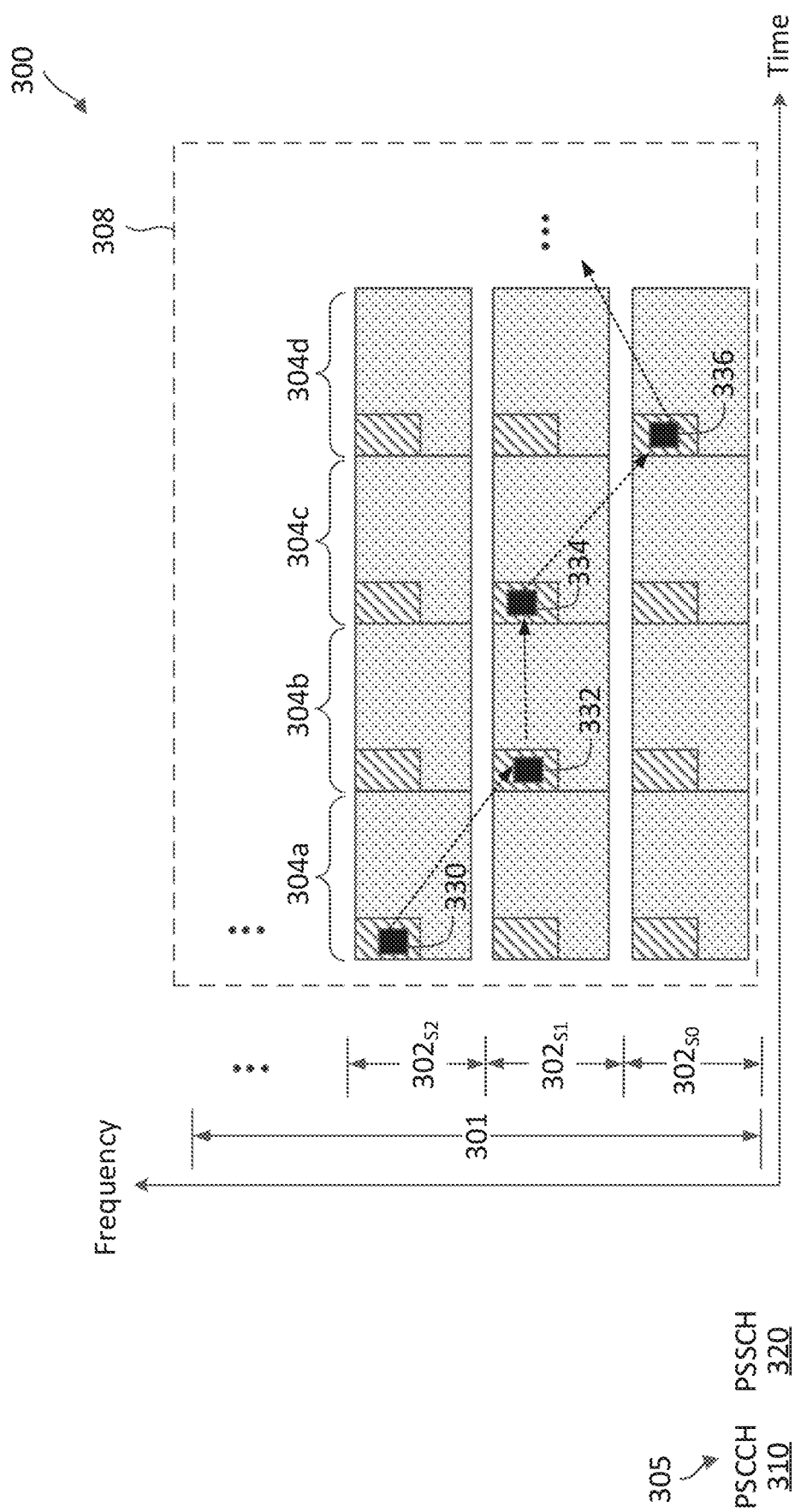
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, 304d, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{S2}$ may be time-partitioned into a plurality of frames with the frame structure 304.

The frame structure 304 includes a sidelink resource 306 in each frequency subband 302. A legend 305 indicates the types of sidelink channels within a sidelink resource 306. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

In sidelink communication, in order for the sidelink receiving UEs to successfully decode the PSCCH 310 and PSSCH 320, information describing the specific resources assigned by the sidelink anchor UE for transmission and the transmission configuration can be carried in the SCI, SCI. In this respect, control information for sidelink communication may be communicated in the form of SCI messages. The SCI message may be transmitted over the PSCCH 310, which carries the information related to the transmission of data over the PSSCH 320.

The SCI may inform the sidelink receiving UEs about a resource reservation interval, a frequency location of initial transmission and retransmission, a time gap between initial transmission and retransmission, and modulation and coding scheme (MCS) used to modulate the data transmitted over the PSSCH 320.

The SCI messages may be populated based on the modes of radio resource allocations (e.g., mode-1 RRA or mode-2 RRA). For mode-1 RRA, the SCI may be populated using higher layer information carried by L3 control signaling (e.g., RRC, and L1 control signaling configured at a cell, such as BS 205). For mode-2 RRA, the SCI may be populated based on autonomous decisions taken by each sidelink anchor UE. The structure of the SCI message may include a frequency hopping flag field, a resource block assignment and hopping resource allocation field, a time resource pattern field, MCS field, a time advance field and a group destination identifier field. The structure of the SCI message may include other additional fields that are suitable to support V2X control signaling. The frequency hopping flag field and the resource block assignment and hopping resource allocation field may provide information for the sidelink receiving UEs to identify the RBs where the data channel (e.g., PSSCH 320) resides. The sidelink anchor UE may autonomously configure each of these two fields. The identified RBs may belong to a sidelink communication resource pool (e.g., PSSCH resource pool). The time resource pattern field may provide the time-domain resource allocation for the data channel (e.g., PSSCH 320), and in particular the potential subframes used for PSSCH transmission. The MCS field may provide the MCS used for the PSSCH 320, which may be autonomously selected by the sidelink anchor UE. The timing advance field may provide a sidelink time adjustment for mode-2 RRA or other applicable mode. The group destination identifier field may indicate a group of sidelink receiving UEs that are potentially interested in the transmitted message from the sidelink anchor UE. This may be used by the sidelink receiving UE to ignore messages destined to other groups of sidelink UEs.

In some aspects, the SCI messages may be processed with transport channel encoding to generate SCI message transport blocks, which are then followed with physical channel encoding to generate corresponding PSCCH blocks. The PSCCH blocks are carried on respective subframe resource units for transmission. The sidelink receiving UE may receive one or more resource units over respective subframes to recover the control signaling information, and can extract the data channel allocation and transmission configuration.

The PSCCH 310 can be used for carrying SCI 330. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS according to a mode-1 RRA configuration. The resource pool 308 may include a plurality of sidelink resources 306.

In an NR sidelink frame structure, the sidelink frames 304 in a resource pool 308 may be contiguous in time. A sidelink receiving UE (e.g., the UEs 115 and/or 215) may include, in SCI 330, a reservation for a sidelink resource 306 in a later sidelink frame 304. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband $302_{S2}$ to reserve a sidelink resource 306 in a next sidelink frame 304b located at the frequency subband $302_{S1}$. Similarly, during the sidelink frame 304b, the sidelink UE transmits SCI 332 in the sidelink resource 306 located in the frequency subband $302_{S1}$ to reserve a sidelink resource 306 in a next sidelink frame 304c located at the frequency subband $302_{S1}$. During the sidelink frame 304c, the sidelink UE transmits SCI 334 in the sidelink resource 306 located in the frequency subband $302_{S1}$ to reserve a sidelink resource 306 in a next sidelink frame 304d located at the frequency subband $302_{S0}$. During the sidelink frame 304d, the sidelink UE transmits SCI 336 in the sidelink resource 306 located in the frequency subband $302_{S0}$. The SCI 336 may reserve a sidelink resource 306 in a later sidelink frame 304.

The SCI can also indicate scheduling information and/or a destination identifier (ID) identifying a target sidelink receiving UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

Figure 4:
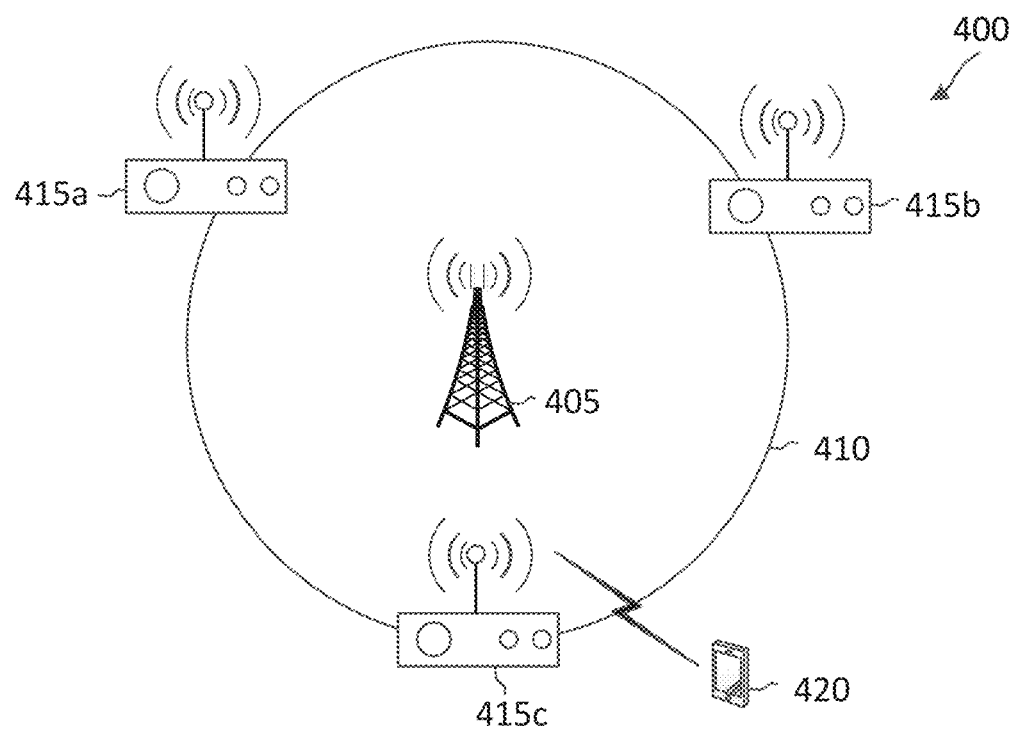
FIG. 4 illustrates a sidelink deployment scenario according to some aspects of the present disclosure.

FIG. 4 illustrates a sidelink deployment scenario 400 according to some aspects of the present disclosure. The scenario 400 illustrates utilization of sidelink for coverage extension. In the scenario 400, relay UEs 415 (shown as 415a, 415b, 415c) in communication with a BS 405 are deployed to extend a coverage 410 of the BS 105. The relay UEs 415a, 415b, 415c may be similar to the UEs 115 and/or 215. The BS 405 may be similar to the UEs 115 and/or 215. Although FIG. 4 illustrates three relay UEs 415, it should be understood that in other examples a network may include any suitable number of relay UEs (e.g., about 2, 4, 5, 6, or more). The relay UEs 415 can facilitate communications between the BS 405 and UEs that are outside of the coverage area 410.

In the illustrated example of FIG. 4, the relay UE 415c operate as a relay for a remote UE 420 outside of the BS 405's coverage area 410. The remote UE 420 may be similar to the UEs 115 and/or 215. In some aspects, the relay UE 415c can be a more advanced UE than the remote UE 420. Although FIG. 4 illustrates the relay UE 415c operating as a relay for one remote UE 420, it should be understood that in other examples a relay UE can operate as a relay for any suitable number of remote UEs (e.g., about 2, 4, 5, 6, or more). The relay UE 415c may receive data and/or control information from the remote UE 420 and forward the received data and/or control to the BS 405. For instance, the data and/or control information received from the remote UE 420 are UL data and/or control information for the BS 405. The relay UE 415c may also receive data and/or control information from the BS 405 and forward the received data and/or control to the remote UE 420. For instance, the data and/or control information received from the BS 405 are DL data and/or control information for the remote UE 420. As such, the relay UE 415c can provide a communication path between the BS 405 and the UE 420 that may otherwise be unreachable by the BS 405. The communication path between the relay UE 415c and the remote UE 420 may be a PC5 interface (shown as a sidelink 422). For instance, the relay UE 415c and the remote UE 420 may communicate using sidelink channels PSSCH and/or PSCCH and/or sidelink resources as discussed above in relation to FIG. 3.

The utilization of sidelink can extend the coverage area of the BS 405 without increasing system resource utilization. For instance, without the utilization of the relay UE 415c, transmissions between the BS 405 and the remote UE 420 may require a large number of repetitions. For instance, the BS 405 may repeat each information data block, for example, about 2048 times, in a transmission before the transmission can be received by the remote UE 420. Similarly, the remote UE 420 may repeat each information data block, for example, about 2048 times, in a transmission before the transmission can be received by the BS 405. While the use of high repetitions can potentially allow the BS 405 to communicate with the remote UE 420, the use of high repetitions can increase power consumption at the remote UE 420. The high repetitions and/or high-power consumption at the remote UE 420 may not be feasible, for example, when the remote UE 420 is a low-end UE with limited processing and/or power resources. Accordingly, the deployment of the relay UE 415c allows the remote UE 420 to communicate with the relay UE 415c, which may be located at a closer distance to the remote UE 420 than the BS 405. Thus, the remote UE 420 may communicate with the relay UE 415c without consuming a large amount of power. Hence, sidelink can improve power efficiency for long-distance UL and/or DL communications. In some instances, sidelink can extend the reach or coverage by providing about a 20 decibels (dB) power boost.

Figure 5:
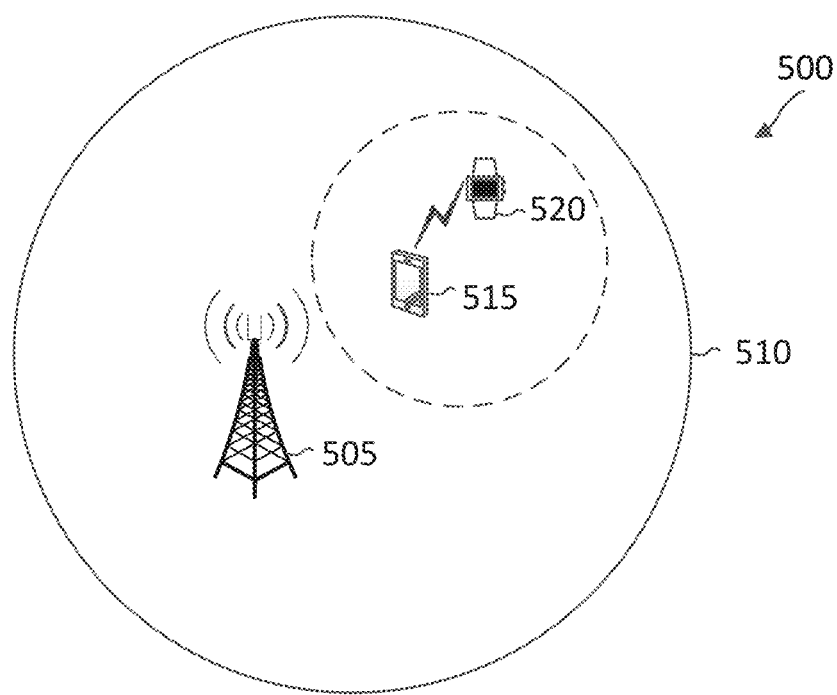
FIG. 5 illustrates a sidelink deployment scenario according to some aspects of the present disclosure.

FIG. 5 illustrates a sidelink deployment scenario 500 according to some aspects of the present disclosure. The scenario 500 illustrates utilization of sidelink for short-range, low-power sidelink communication, for example, for wearable or in-home network. In the scenario 500, a relay UE 515 in communication with a BS 505 is deployed to operate as a central hub or anchor UE for a remote UE 520. The BS 505 may be similar to the UEs 115 and/or 215. The relay UE 515 and/or the remote UE 520 may be similar to the UEs 115 and/or 215. However, the relay UE 515 can be a more advanced UE than the remote UE 420. For instance, the relay UE 515 may be a high-end UE or a mid-end UE, whereas the remote UE 420 may be a low-end UE (e.g., personal wearable devices, health monitoring devices, and/or like). Although FIG. 5 illustrates one relay UE 515 serving one remote UE 520, it should be understood that in other examples a network may include any suitable number of relay UEs (e.g., about 2, 3, 4, 5, 6, or more) serving any suitable number of remote UEs (e.g., about 2, 3, 4, 5, or more).

Similar to the scenario 400, the relay UE 515 may communicate with the remote UE 520 via a sidelink 522. However, the remote UE 520 may or may not have communication link established with the BS 505, for example, depending on the device types and/or applications in use. In some other instances, a V2X or D2D system may be deployed in a scenario similar to the scenario 500.

As can be seen from the scenarios 400 and 500, sidelink can be utilized to improve power efficiency, for example, for NR-super-lite where the focus is low-power operations for low-end UEs.

Accordingly, the present disclosure provides sidelink resource allocation techniques that can facilitate low-power communications over sidelink, for example, a relay UE or gNB may allocate the sidelink resource pool to the remote UE, and the remote UE may select the reverse link resource form the resource pool. In some aspects, the remote UE may select the reverse link by itself. In some other aspects, the remote UE may select the reverse link based on UE ID. The reverse link allocation to the remote UE can avoid the half-duplex link issues discussed above. Additionally, since a remote UE may only be required to monitor the forward link resources, and not the reverse link resources, the reverse link allocation can reduce the amount of resources in the sidelink resource pool that a remote UE is required to monitor, and thus may provide further power saving at the remote UE.

Figure 6:
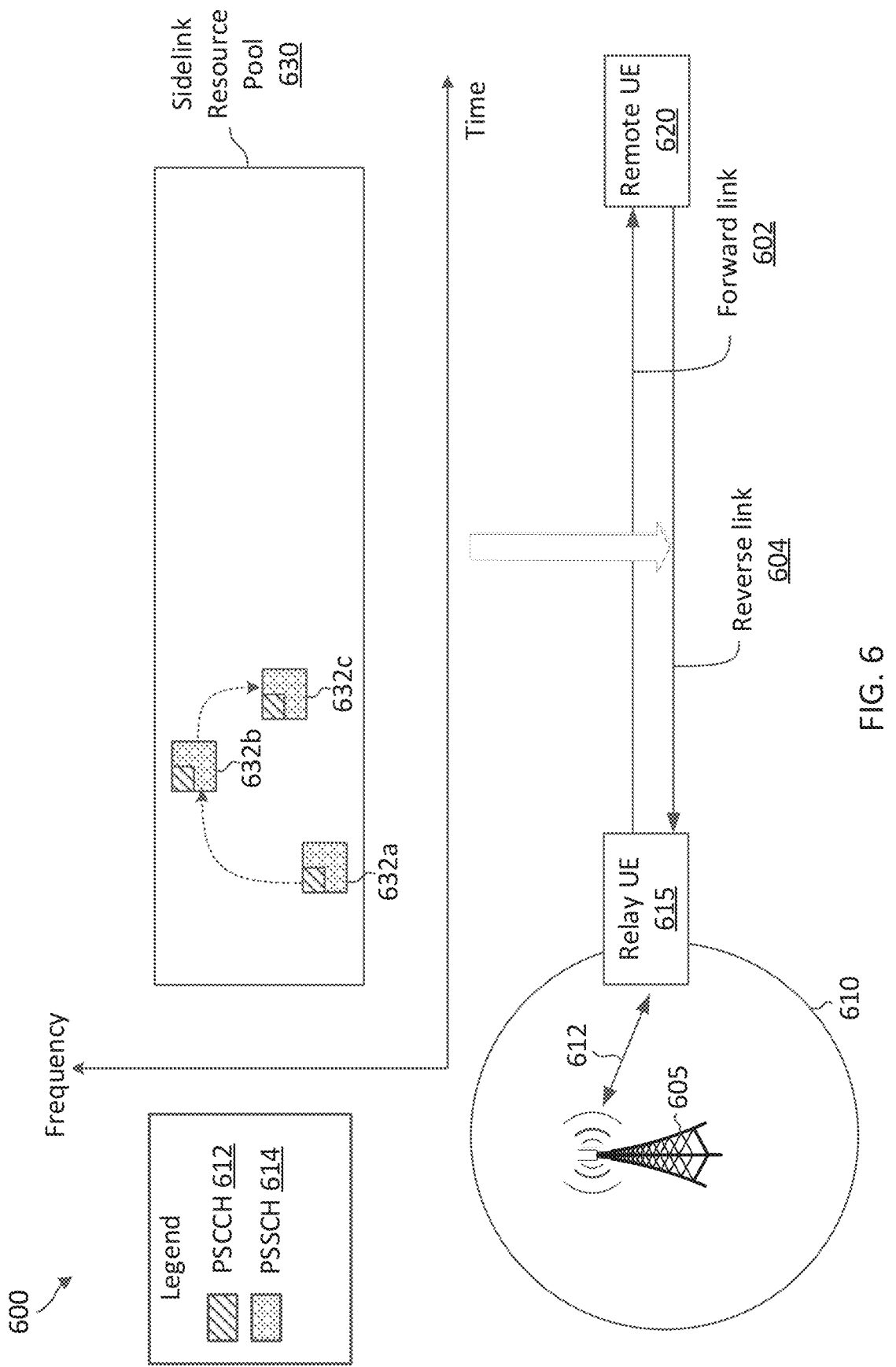
FIG. 6 illustrates a sidelink communication scheme with reverse link operations according to some aspects of the present disclosure.

FIG. 6 illustrates a sidelink communication scheme 600 with reverse link operations according to some aspects of the present disclosure. The scheme 600 may be employed by UEs such as the UEs 115, 215 and/or 415, 420, 510, 520 in a network such as the networks 100 and/or 200 and/or in the scenarios 400 and 500 for sidelink communications. In particular, sidelink UEs may employ the scheme 600 to perform reverse link resource allocation, for example, allocation of time slot to forward and/or reverse links for sidelink communication. In FIG. 6, the x-axis represents time in some arbitrary units, and the y-axis represents frequency in some arbitrary units. In the scheme 600, a relay UE 615 within a coverage area 610 of a BS 605 and in communication with the BS 605 over a link 606 may operate as a relay for a remote UE 620. For instance, the relay UE 615 may relay UL communication (received over a reverse link 604) from the remote UE 620 to the BS 605 (over the link 606) and/or relay DL communication from the BS 605 (over the link 606) to the remote UE 620 (over a forward link 602). The BS 605 may be similar to the BSs 105, 205, 405, and/or 505. The relay UE 615 and/or the remote UEs 620 may be similar to the UEs 115 and/or 215. In some instances, the relay UE 615 may correspond to the relay UE 415c, and the remote UE 620 may correspond to the remote UE 420 in the scenario 400. In some instances, the relay UE 615 may correspond to the relay 515, and the remote UE 620 may correspond to the remote UE 520 in the scenario 500. The scheme 600 can be employed in conjunction with the scheme 300.

In the scheme 600, the relay UE 615 may communicate with the remote UE 620 using resources (e.g., time-frequency resources) from a sidelink resource pool 630. In particular, the sidelink resource pool 630 can be used for transmissions from the remote UE 620 to the relay UE 615 over the reverse link 604. The sidelink resource pool 630 may be over a licensed band or a shared radio frequency band (e.g., in a shared spectrum or an unlicensed spectrum. The resource pool 632 may have the same sidelink slot resource structure (including 14 symbols) as in FIG. 3. For instance, the resource pool 630 may include a set of sidelink resources 632, for example, arranged in a number of slots across time and a number of subband in frequency similar to the sidelink resources 306 shown in FIG. 3. Each sidelink resource 632 may include a PSCCH 612 (e.g., the PSCCH 310) and a PSSCH 614 (e.g., PSSCH 320). For simplicity of illustration and discussion, FIG. 6 illustrates three sidelink resources 632 (shown as 632a, 632b, and 632c).

In some aspects, the sidelink resource pool 630 may be used reverse link transmissions only, and the relay UE 615 may transmit forward link transmissions over the forward link 602 to the remote UE 620 using a different sidelink resource pool (e.g., time multiplexed with the sidelink resource pool 630). In some other aspects, the sidelink resource pool 630 can be used for forward link and/or reverse link transmissions. In some aspects, the BS 605 may configure the relay UE 615 with the sidelink resource pool 630, and the relay UE 615 may configure the remote UE 620 with the sidelink resource pool 630. In some other aspects, the BS 605 may configure the relay UE 615 with the sidelink resources (e.g., multiplexed with UL/DL resources for UL/DL communications between the BS 605 and in-coverage UEs), and the relay UE 615 may determine the sidelink resource pool 630 from the sidelink resources configured by the BS 605. In some aspects, the remote UE 620 may be preconfigured with the sidelink resource pool 630. In some aspects, the preconfigured resource pool may not indicate whether the resources are for the forward 602 or the reverse link 604.

Figure 7A:
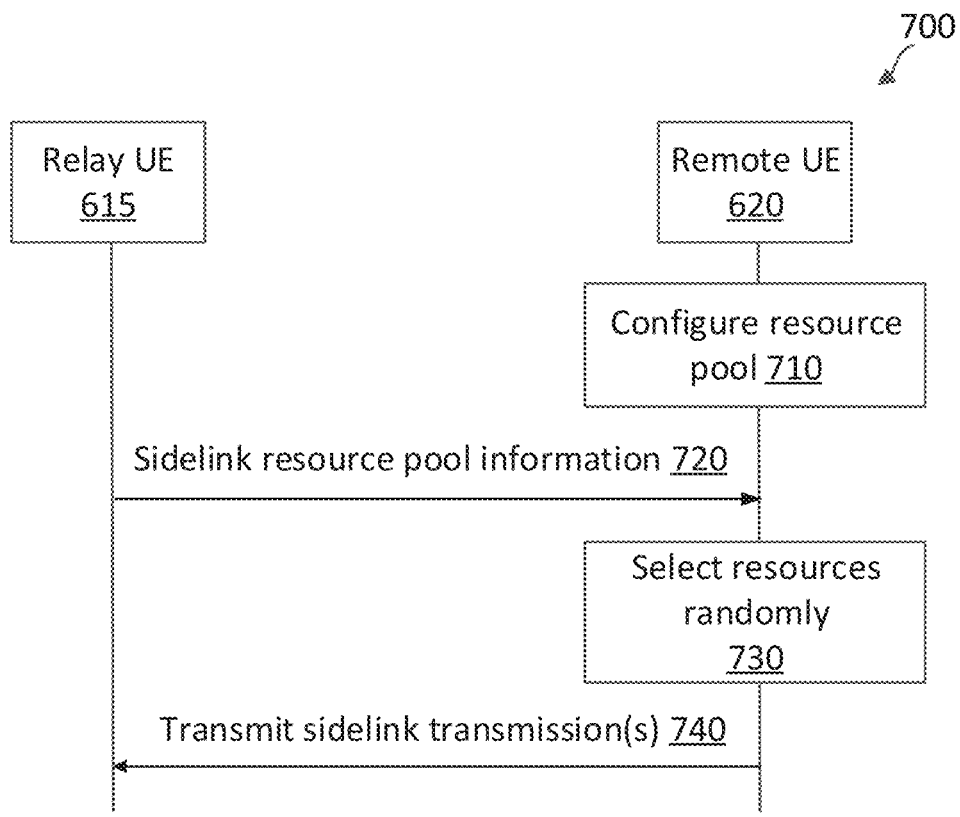
FIG. 7A is a sequence diagram illustrating a sidelink reverse link operation method according to some aspects of the present disclosure.
Figure 7B:
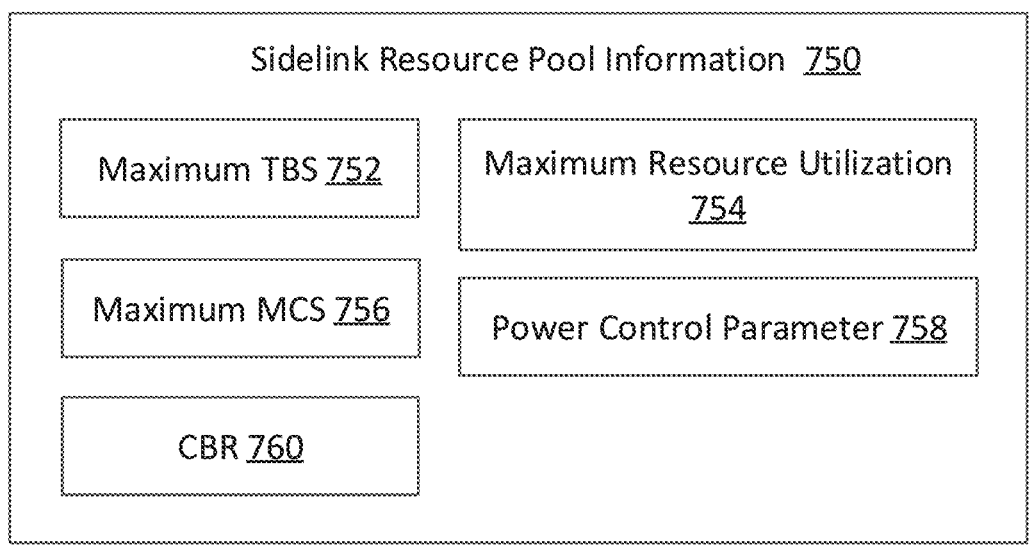
FIG. 7B is a block diagram illustrating a sidelink reverse link information message according to some aspects of the present disclosure.

To facilitate transmissions from the remote UE 620 to the relay UE 615 and control resources usages in the sidelink resource pool 630, the relay UE 615 may configure the remote UE 620 with sidelink resource pool information (e.g., the message 750 of FIG. 7B). In some aspects, the sidelink resource pool information may include a maximum TBS, a maximum resource utilization parameter, a maximum MCS, a CBR, a frequency hopping pattern, and/or power control parameter(s). Accordingly, the remote UE 620 may select a first set of resource for the reverse link communication to the relay UE 615 based on the resource pool information.

In some aspects, the remote UE 620 may randomly select a first resource (e.g., the resource 632*a*) from the set of resources in the sidelink resource pool 630 for a reverse link transmission to the relay UE 615. For instance, the remote UE 620 draw a random number and may select the reverse link resource 632*a* based on the drawn random number. In some other aspects, the remote UE 620 may select a first resource (e.g., the resource 632*a*) from the set of resources in the sidelink resource pool 630 for a reverse link transmission to the relay UE 615 based on a UE ID of the remote UE 620. For instance, the remote UE 620 may use C-RNTI ID for unique identification at the cell level identifying a RRC connection or may use RA-RNTI ID during some transient states. In some aspects, the remote UE 620 may further select one or more resources (e.g., the resources 632*b* and 632*c*) from the sidelink resource pool 630. For instance, the remote UE 620 may transmit, in the PSCCH 612 of the resource 632*a*, SCI indicating a reservation for the resource 632*b*. Similarly, the remote UE 620 may transmit, in the PSCCH 612 of the resource 632*b*, SCI indicating a reservation for the resource 632*c*. In some aspects, the remote UE 620 may apply HARQ techniques to increase the reliability of the reverse link transmissions. The remote UE 620 can perform blind retransmission and may use resource 632*b* and 632*c* for the blind retransmissions. Blind retransmission may refer to the remote UE 620 retransmitting a data block (e.g., a transport block) without receiving a NACK feedback from the relay UE 615. In this regard, the remote UE 620 may transmit an initial transmission of a data block in the PSSCH 614 of the resource 632*a*, and subsequently retransmit the data block in the PSSCH 614 of the resource 632*b*, and the further retransmit the data block in the PSSCH 614 of the resource 632*c*. The remote UE 620 may transmit, in the PSCCH 612 of the resource 632*a*, SCI indicating HARQ related parameters and/or transmission parameters (e.g., MCS) associated with the data block in the PSSCH 614 of the resource 632*a*. Similarly, the remote UE 620 may transmit, in the PSCCH 612 of the resource 632*b*, SCI indicating HARQ related parameters and/or transmission parameters (e.g., MCS) associated with the data block in the PSSCH 614 of the resource 632*b*, and so on. In some other aspects, the relay UE 615 may provide explicit feedback (e.g., ACK or NACK) to the remote UE 620 indicating whether a data and/or control block is correctly decoded or not.

In some aspects, the sidelink resource pool information may include some UE-specific control information. For instance, the relay UE 615 may provide a first TBS, a first MCS, power control parameter(s), a CBR, and/or a first frequency hopping pattern in the sidelink resource pool information, where at least some of the parameters are specific to the remote UE 620. In some aspects, the remote UE 620 may transmit, to the relay UE 615 data and control signaling in the resource 632*a*, 632*b*, and/or 632*c* using the sidelink resource pool information. For example, the remote UE 620 may transmit a data block having a TBS equal or less than the first TBS and/or using an MCS values less or equal than the first MSC in the resource 632*a*, 632*b*, and/or 632*c*.

In some aspects, the remote UE 620 may adjust its transmission power for the transmission of the block to the relay UE 615, for example, using an open loop power control scheme base on the power control parameter(s). For instance, the remote UE 620 may receive a signal (e.g., sidelink synchronization signal block (S-SSB)) from the relay UE 615 and may calculate a pathloss from the relay UE 615 to the remote UE 620 based on a received power of the received signal. The remote UE 620 may perform an open loop power control to adjust its transmission power to compensate for the path loss in the reverse link 604 from the remote UE 620 to the relay UE 615, for example, based on a channel reciprocity.

In some aspects, the remote UE 620 may select the resource 632*a*, 632*b*, and/or 632*c* from the set of resources in the sidelink resource pool 630 based on the CBR. A CBR is a metric indicating a number of subchannels (e.g., the frequency subbands 302) in a sidelink resource pool (e.g., the sidelink resource pool 630) with a measured receive signal strength indicator (RSSI) greater than a certain threshold divided by the total number of subchannels in the resource pool. The CBR can provide an estimation on the total occupancy state of the channel. As such, the remote UE 620 may monitor the occupancy of the sidelink resource pool 630, for example, based on SCI sensing and monitoring, and compute a CBR for the sidelink resource pool 630. If the remote UE 620 determines that the computed CBR is below the CBR indicated in the sidelink resource pool information, the remote UE 620 may select a resource from the sidelink resource pool 630 for a reverse link transmission to the relay UE 615. If, however, the remote UE 620 determines that the computed CBR exceeds the CBR indicated in the sidelink resource pool information, the remote UE 620 may refrain from selecting a resource from the sidelink resource pool 630 for a reverse link transmission to the relay UE 615.

In some aspects, the remote UE 620 may use the frequency hopping pattern to select a second resource (e.g., the resource 632*b* and 632*c*) from the sidelink resource pool 630 in a different frequency subband than the first resource (e.g., the resource 632*a*), to communicate to the relay UE 615. In some aspects, the remote UE 620 may be configured with a UE-specific frequency-hopping pattern (e.g., based on the remote UE 620's UE ID) to minimize interferences among sidelink UEs that share or utilize resources in the sidelink resource pool 630 for sidelink transmissions. In some aspects, the remote UE 620 may also be configured with a UE-specific scrambling ID to minimize interference in the sidelink resource pool 630. In this regard, the remote UE 620 may scramble information bits in a data block with a scrambling sequence determined from the remote UE 600's UE ID.

After configuring the remote UE 620 with the sidelink resource pool information, the remote UE 620 may communicate with the relay UE 615 in accordance with the sidelink resource pool information. In this regard, the remote UE 620 may transmit sidelink data and control signaling (e.g., scheduling information, SCI) to the relay UE 615 using resource(s) from the set of resources in the sidelink resource pool 630. For instance, the remote UE 620 may transmit data over PSSCH associated with a hybrid automatic repeat request (HARQ) process, and control signaling over PSCCH in a resource from the first set of resources. Accordingly, the relay UE 615 may receive sidelink data over PSSCH, and control signaling over PSCCH in a resource from the first set of resources.

In some other aspects, the remote UE 620 may transmit, in a PSCCH of the first resource 632*a*, sidelink control information indicating the second resource 632*b*. In some aspects, the remote UE 620 may use blind transmission of the data and control signaling blocks. For example, the remote UE 620 may use HARQ scheme with frequency hopping and redundancy version (RV) cycling for each retransmission. For instance, a HARQ data block may be coded with RV of 0, 1, 2, and 3, and the remote UE 620 may cycle through the RV 0, 1, 2, and 3 by transmitting an a data block coded based on an RV of 0 in the resource 632a, a retransmission of the data block coded based on an RV of 1 in the resource 632b, and a retransmission of the data block coded based on an RV of 2 in the resource 632c. In some aspects, the relay UE 615 may provide explicit feedback to the remote UE 620 indicating that the data and control blocks are whether correctly decoded or not.

In some aspects, the relay UE 615 can receive, from the remote UE 620, and decode signals from the physical communication channels (e.g., PSCCH 612, PSSCH 614) in the reverse link 604, and encode and transmit signals in the physical communication channels (e.g., PSCCH 612, PSSCH 614) to the remote UE 620 in the forward link 602.

FIGS. 7A-7B are discussed in relation to each other to illustrate sidelink reverse link operations. FIG. 7A is a sequence diagram illustrating a sidelink reverse link operation method 700 according to some aspects of the present disclosure. The method 700 may be implemented between the relay UE 615 and the remote UE 620. The method 700 may employ similar mechanisms as discussed above with respect to FIGS. 4-6 for communications. Although the method 700 illustrates the relay UE 615 in communication with one remote UE 620, it should be understood that in other examples the relay UE 615 may communicate with any suitable number of remote UEs 620 (e.g., about 2, 3, 4, 5, 6 or more) over a sidelink. As illustrated, the method 700 includes a number of enumerated actions, but embodiments of the method 700 may include additional actions before, after, and in between the enumerated actions. In some embodiments, one or more of the enumerated actions may be omitted or performed in a different order.

At action 710, the remote UE 620 may configure a sidelink resource pool. The sidelink resource pool include a set of sidelink resources similar to the resources 630 shown in FIG. 6. In some aspects, the configuration for the sidelink resource pool may be based on predetermined parameters stored at the remote UE 620. In some aspects, the remote UE 620 may receive a configuration for the sidelink resource pool from the relay UE 615 at an earlier time. In some aspects, the remote UE 620 may receive a configuration for the sidelink resource pool from the BS 605 via the relay UE 615.

At action 720, the relay UE 615 may transmit sidelink resource pool information to the remote UE 620. In some aspects, the relay UE 615 may configure or determine the sidelink resource pool information, for example, to control the usages of the resources in the sidelink resource pool by the remote UE 620. Since the sidelink resource pool is preconfigured, the relay UE 615 may provide the remote UE 620 with a minimum amount of information for controlling the usages of the resources in the sidelink resource pool. For instance, the sidelink resource pool information may include a maximum TBS, a maximum resource utilization parameter, a maximum MCS, a CBR, a frequency hopping pattern, and/or power control parameter(s) as discussed above in relation to FIG. 6. An exemplary sidelink resource pool information message 750 is shown in FIG. 7B.

At action 730, the remote UE 620 may select a first resource from the set of resources in the sidelink resource pool configured at action 710. In some aspects, the remote UE 620 may select the first resource from the set of resources based on a random number. For instance, the remote UE 620 may randomly select the first resource 632a of FIG. 6 for a reverse link transmission to the relay UE 615. The remote UE 620 may also consider the parameters indicated by the sidelink resource pool information received at action 720 for the random selection.

Action 740, the remote UE 620 may transmit, to the relay UE 615 data and control signaling (e.g., scheduling information, SCI, ACK/NCK) using the selected first resource. In some aspects, the remote UE 620 may transmit sidelink data over PSSCH, and control signaling over PCSCH in a resource similar to the resource 632 and/or 306 within the first resource.

FIG. 7B is a block diagram of an exemplary sidelink resource pool information message 750 according to some aspects of the present disclosure. In some aspects, the relay UE 615 may transmit the sidelink resource pool information message 750 to the remote UE 620, for example, at action 720 of method 700. In some other aspects, a BS 605 may transmit the sidelink resource pool information message 750 to the remote UE 620, for example, via the relay UE 615. As shown, the resource pool information message 750 includes maximum TBS 752, maximum resource utilization 754, maximum MCS 756, power control parameter 758, and CBR 760. The remote UE 615 may use the parameters indicated in the sidelink resource pool information message 750 to select resources and/or transmit data and control signaling to the relay UE 615 over a reverse link 604. It should be noted that the message 750 can include one or more of the parameters as shown.

In some aspects, the remote UE 620 may transmit a data block to the relay UE 615, where the data block may a transport block having a TBS less or equal to the maximum TBS 752. In some aspects, the remote UE 620 may transmit data encoded using an MCS having a MSC value less than or equal to the maximum MCS 756. In some aspects, the MCS values may be in the range of 0 to N, where a greater value may indicate a higher MCS order (e.g., in terms of modulation order or code rate). For instance, the MCS 756 may indicate a MCS value of 5 (e.g., for QPSK with a code rate of ½), and thus the remote UE 620 may select a MCS value that is 5 or less than 5.

In some aspects, the maximum resource utilization 754 may indicate a maximum amount of resources that the remote UE may use from the sidelink resource pool for reverse link transmissions (e.g., over a certain time period). Accordingly, the remote UE 620 may select a set of resources from the sidelink resource pool for reverse link transmissions, where the set of resource may have a size less or equal to the maximum resource utilization 754. In some aspects, the remote UE 620 may use CBR 760 to determine channel availability in the sidelink resource pool to determine the set of resource for reverse link transmissions. In some aspects, the remote UE 620 may estimate the path loss from a signal (e.g., synchronization signal and/or S-SSB) received from the relay UE 615, and may use power control parameters 758, to adjust it transmission power according the estimated path loss.

Figure 8:
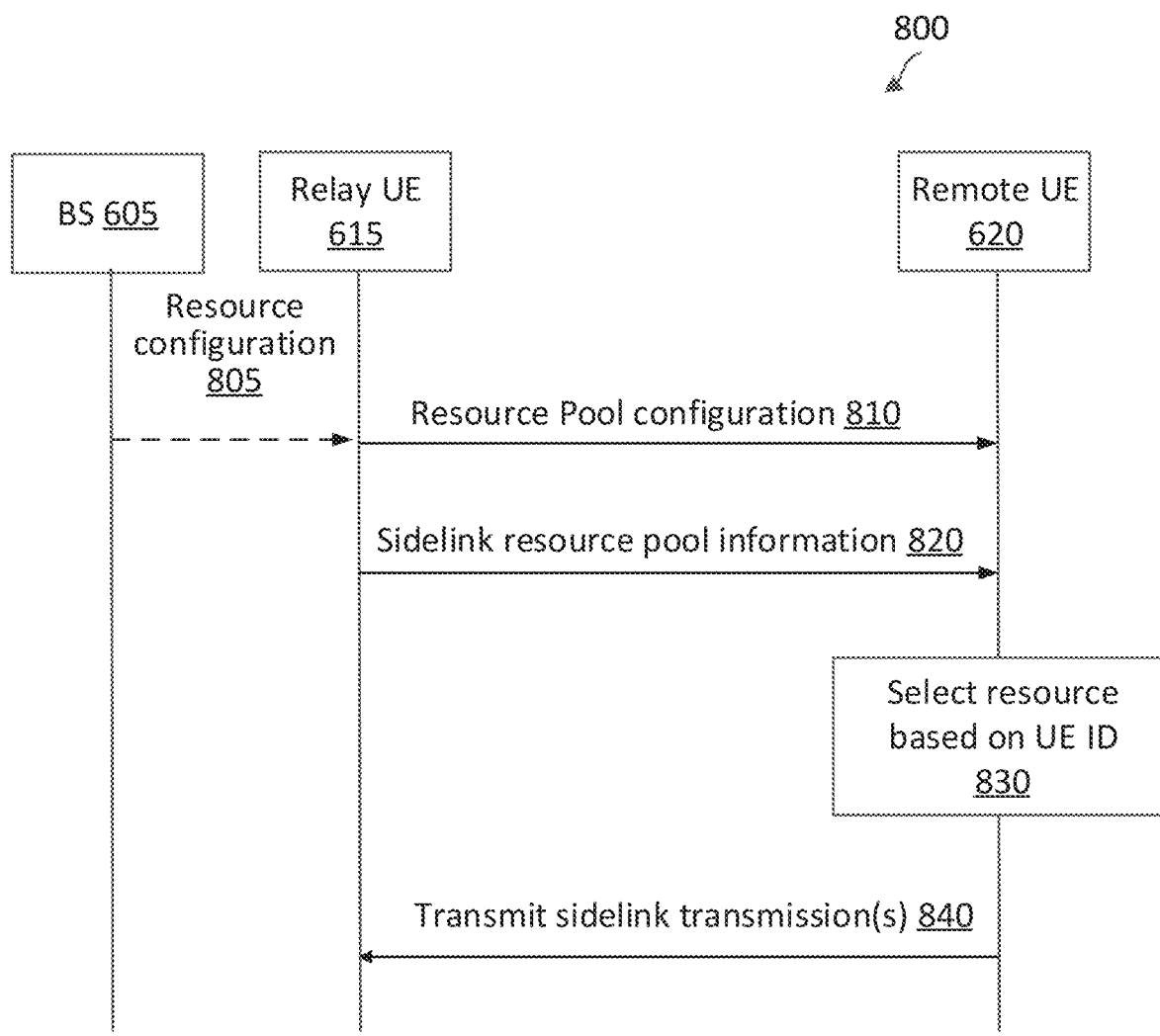
FIG. 8 is a sequence diagram illustrating a sidelink reverse link operation method according to some aspects of the present disclosure.

FIG. 8 is a sequence diagram illustrating a sidelink reverse resource allocation method 800 according to some aspects of the present disclosure. The method 800 may be implemented between a BS 605, the relay UE 615, and the remote UE 620. The method 800 may employ similar mechanisms as discussed above with respect to FIGS. 4-6 for communications. Although the method 800 illustrates the relay UE 615 in communication with one remote UE 620, it should be understood that in other examples the relay UE 615 may communicate with any suitable number of remote UEs 620 (e.g., about 2, 3, 4, 5, 6 or more) over a sidelink.

As illustrated, the method 800 includes a number of enumerated actions, but embodiments of the method 800 may include additional actions before, after, and in between the enumerated actions. In some embodiments, one or more of the enumerated actions may be omitted or performed in a different order.

At action 805, the BS 605 may transmit a resource configuration to the relay UE 615. The relay UE 615 may use the resource configuration received from the BS 605 to configure resources or a sidelink resource pool for reverse link transmission (from the remote UE 620 to relay UE 615). In other words, the BS 605 may manage the sidelink resources used by the relay UE 615 and remote UE 620 for sidelink communications. In some other aspects, the action 805 may be optional, and the relay UE 615 may determine the sidelink resource pool based on a pre-configuration.

At action 805, the BS 605 transmits a resource configuration to the relay UE 615. The resource pool configuration may indicate a sidelink resource pool similar to the sidelink resource pool 630 and may include a set of sidelink resources similar to the sidelink resources as discussed above in relation to FIG. 6.

At action 810, the relay UE 615 may transmit a configuration for a sidelink resource pool to the remote UE 620, for example, based on the resource configuration received from the BS 605. In some other aspects, the action 805 may be optional, and the relay UE 615 may determine the sidelink resource pool based on a pre-configuration. In yet some other aspects, the action 810 may be optional, where the remote UE 620 can be preconfigured with the sidelink resource pool.

At action 820, the relay UE 615 may transmit sidelink resource pool information to the relay UE 615. In some aspects, the relay UE 615 may configure or determine the sidelink resource pool information, for example, to control the usages of the resources in the sidelink resource pool by the remote UE 620. The sidelink resource pool information may be similar to the sidelink resource pool information message 750 as discussed above in relation to FIG. 7B.

At action 830, the remote UE 620 may select a first resource from the set of resources in the sidelink resource pool indicated by the configuration received at action 820. In some aspects, the remote UE 620 may select the first resource based on a UE ID (e.g., C-RNTI, RA-RNTI). The remote UE 620 may also consider the parameters indicated by the sidelink resource pool information received at action 820 for the random selection, for example, using similar mechanisms as discussed above in relation to FIGS. 7A-7B.

At action 840, the remote UE 620 may transmit, to the remote UE 620 data and control signaling (e.g., scheduling information, SCI, ACK/NCK) using the first resource. In some aspects, the remote UE 620 may transmit sidelink data over PSSCH, and control signaling over PCSCH in the first resource. In some aspects, the remote UE 620 may omit a source ID and/or a destination ID from SCI when transmitting a sidelink transmission to the relay UE 615 as the relay UE 615 is aware of the first resource based on the remote UE 620's UE ID.

In general, a remote UE 620 may be preconfigured with a sidelink resource pool or receive a configuration for a sidelink resource pool, and may receive sidelink resource pool information (e.g., the message 750) for resource selection and/or transmission over a reverse link 604 to a relay UE 615. The remote UE 620 may select one or more resources from the sidelink resource pool at a time based on the received sidelink resource pool information. The remote UE 620 may select a first resource (e.g., for an initial transmission) randomly as discussed in the method 700 or based on a UE ID of the remote UE 620 as discussed in the method 800. The remote UE may select one or more other resources (e.g., for retransmission(s)) based on frequency-hopping pattern.

Figure 9:
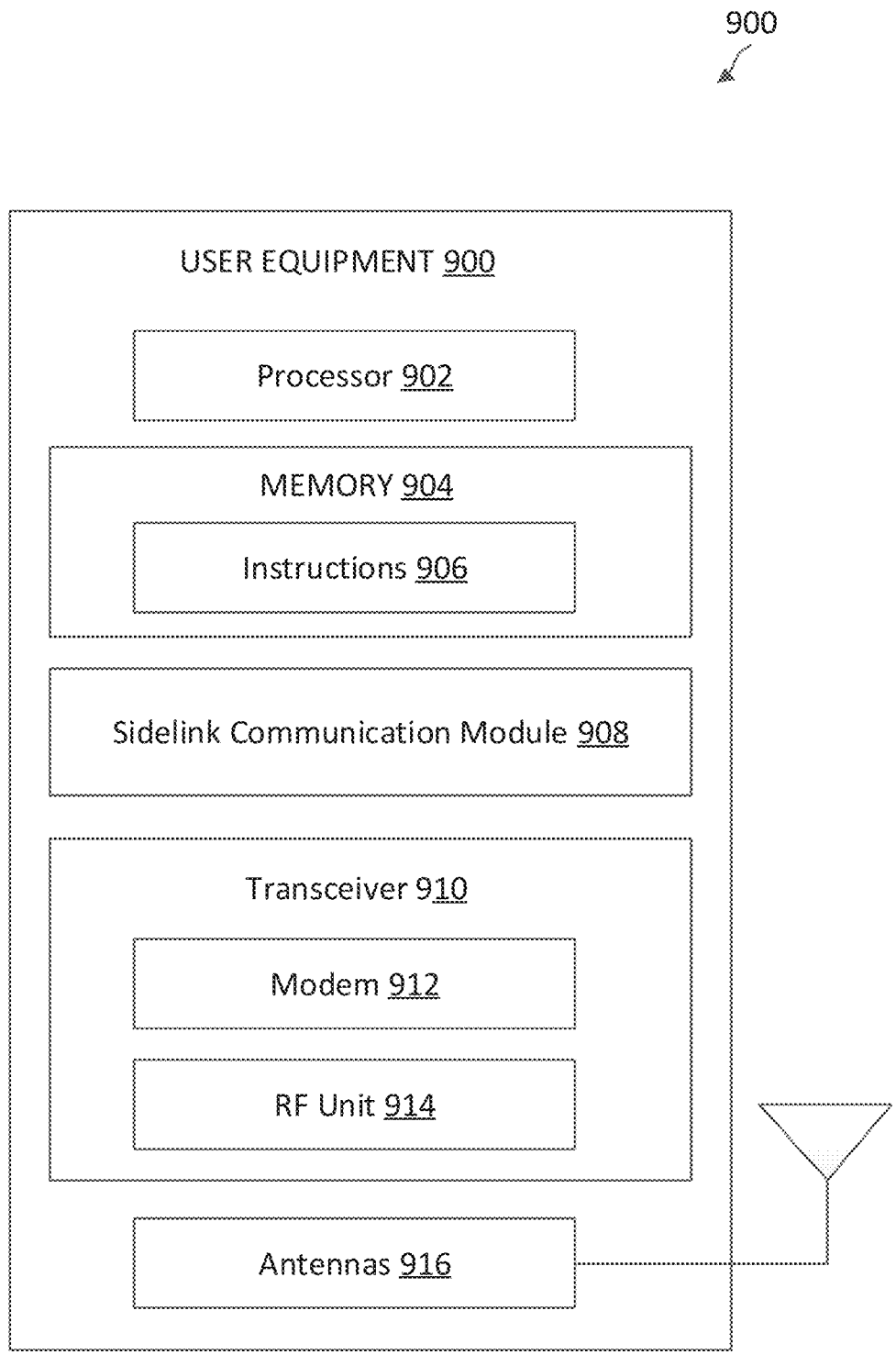
FIG. 9 is a block diagram of an exemplary user equipment (UE) according to some aspects of the present disclosure.

FIG. 9 is a block diagram of an exemplary UE 900 according to some aspects of the present disclosure. The UE 900 may be a UE 115 as discussed above with respect to FIG. 1, a UE 215 as discussed above with respect to FIG. 2, a UE 415 or 420 as discussed above with respect to FIG. 4, a UE 515 or 520 as discussed above with respect to FIG. 5, or a UE 615 or 620 as discussed above with respect to FIG. 6. As shown, the UE 900 may include a processor 902, a memory 904, a sidelink communication module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115 in connection with aspects of the present disclosure, for example, aspects of FIGS. 2-6, 7A-7B, and 8. Instructions 906 may also be referred to as program code, which may be interpreted broadly to include any type of computer-readable statement(s).

The sidelink communication module 908 may be implemented via hardware, software, or combinations thereof. For example, the sidelink communication module 908 may be implemented as a processor, circuit, and/or instructions 906 stored in the memory 904 and executed by the processor 902. In some examples, the sidelink communication module 908 can be integrated within the modem subsystem 912. For example, the sidelink communication module 908 can be implemented by a combination of software components (e.g., executed by a DSP or a general processor) and hardware components (e.g., logic gates and circuitry) within the modem subsystem 912.

The sidelink communication module 908 may communicate with various components of the UE 900 to perform aspects of the present disclosure, for example, aspects of FIGS. 2-6, 7A-7B, and 8. In some aspects, the UE 900 is a relay sidelink UE similar to the relay UE 415 of FIG. 4, the relay UE 515 of FIG. 5, or the relay UE 615 of FIG. 6. For instance, the sidelink communication module 908 is configured to transmit, to a second UE (e.g., a remote UE similar to the UE 115, 215, 420, 520, or 620) over a sidelink, sidelink resource pool information for a sidelink resource pool. The sidelink resource pool may be similar to the sidelink resource pool 630 and may include a set of resources similar of the resources 632 as discussed above in relation to FIG. 6. The sidelink resource pool may be associated with the reverse link (e.g., the reverse link 604). The sidelink resource pool information may be similar to the sidelink resource pool information message 750 discussed above in relation to FIGS. 7A-7B. The sidelink communication module 908 is further configured to receive, from the second UE over the reverse link, a first sidelink transmission in a first resource of the set of resources in the sidelink resource pool. For instance, the sidelink communication module 908 may be configured to receive, from the second UE, and decode PSCCH 310 and PSSCH 320 in the reverse link 604.

In some aspects, the UE 900 is a remote sidelink UE similar to the remote UE 420 of FIG. 4, the remote UE 520 of FIG. 5, or the remote UE 620 of FIG. 6. For instance, the sidelink communication module 908 is configured to receive, from a second the UE (e.g., a relay UE similar to the UE 115, 215, 415, 515, or 615) over a sidelink, resource pool information for a sidelink resource pool. The sidelink resource pool may be similar to the sidelink resource pool 630 and may include a set of resources similar of the resources 632 as discussed above in relation to FIG. 6. The sidelink resource pool information may be similar to the sidelink resource pool information message 750 discussed above in relation to FIGS. 7A-7B. The sidelink communication module 908 is further configured to select a first resource from the set of resources in the resource pool. The set of resource may be associated with the reverse link (e.g., the reverse link 604). In some aspects, the sidelink communication module 908 is further configured to transmit to the second UE over the reverse link, a sidelink transmission using the selected first resource. For instance, the sidelink communication module 908 may be configured to encode and transmit the PSCCH 310 and PSSCH 320 to the second UE using the first resource.

In some aspects, the sidelink communication module 908 is configured to select the first resource from the set of resources randomly. In some aspects, the sidelink communication module 908 is configured to select the first resource from the set of resources based on a UE ID associated with the UE 900. In this regard, the sidelink communication module 908 may be configured to receive from the relay UE over the sidelink, the minimum information required to determine the first set of resources. In some aspects, the sidelink resource pool information may include a maximum TBS, a maximum resource utilization parameter, a maximum MCS, power control parameter(s), CBR, etc. from the second UE, and may use this information to select the first resource from the set of resources.

In some aspects, the sidelink communication module 908 is further configured to apply a frequency hopping pattern to select resources (e.g., the resources 632a, 632b, and 632c in different frequency subbands) from the set of resources in the sidelink resource pool or reverse link transmissions to the second UE and perform frequency-hopping for the reverse transmission. In some aspects, the sidelink communication module 908 may be configured to use a UE-specific frequency hopping to select the resources, for example, to minimize the interference effects in the sidelink resource pool. In some aspects, the sidelink communication module 908 may be configured to generate a transmission signal for transmission over a reverse link to the second UE by applying a UE-specific scrambling sequence to a data block, for example, to minimize the interference effects in the sidelink resource pool.

In some aspects, the sideline communication module 908 is further configured to perform a HARQ mechanism, add redundant bits to a data block for the transmission in the first set of resource from the remote UE to the relay UE. In some aspects, the HARQ may include a blind retransmission scheme with frequency hopping and RV cycling. In some aspects, the relay UE may provide an ACK or NACK to the remote UE indicating the data block is correctly decoded or not.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904 and/or the sidelink communication module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., sidelink data, SCI, PSSCH, PSCCH, sidelink resource pool allocation, sidelink resource pool information, sidelink resource pool control parameters, UE-specific information for sidelink resource selection) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may include one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., sidelink data, SCI, PSSCH, PSCCH, sidelink resource pool allocation, sidelink resource pool information, sidelink resource pool control parameters, UE-specific information for sidelink resource selection) to the sidelink communication module 908 for processing. The antennas 916 may include multiple antennas of similar or different designs in order to sustain multiple transmission links. The RF unit 914 may configure the antennas 916.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
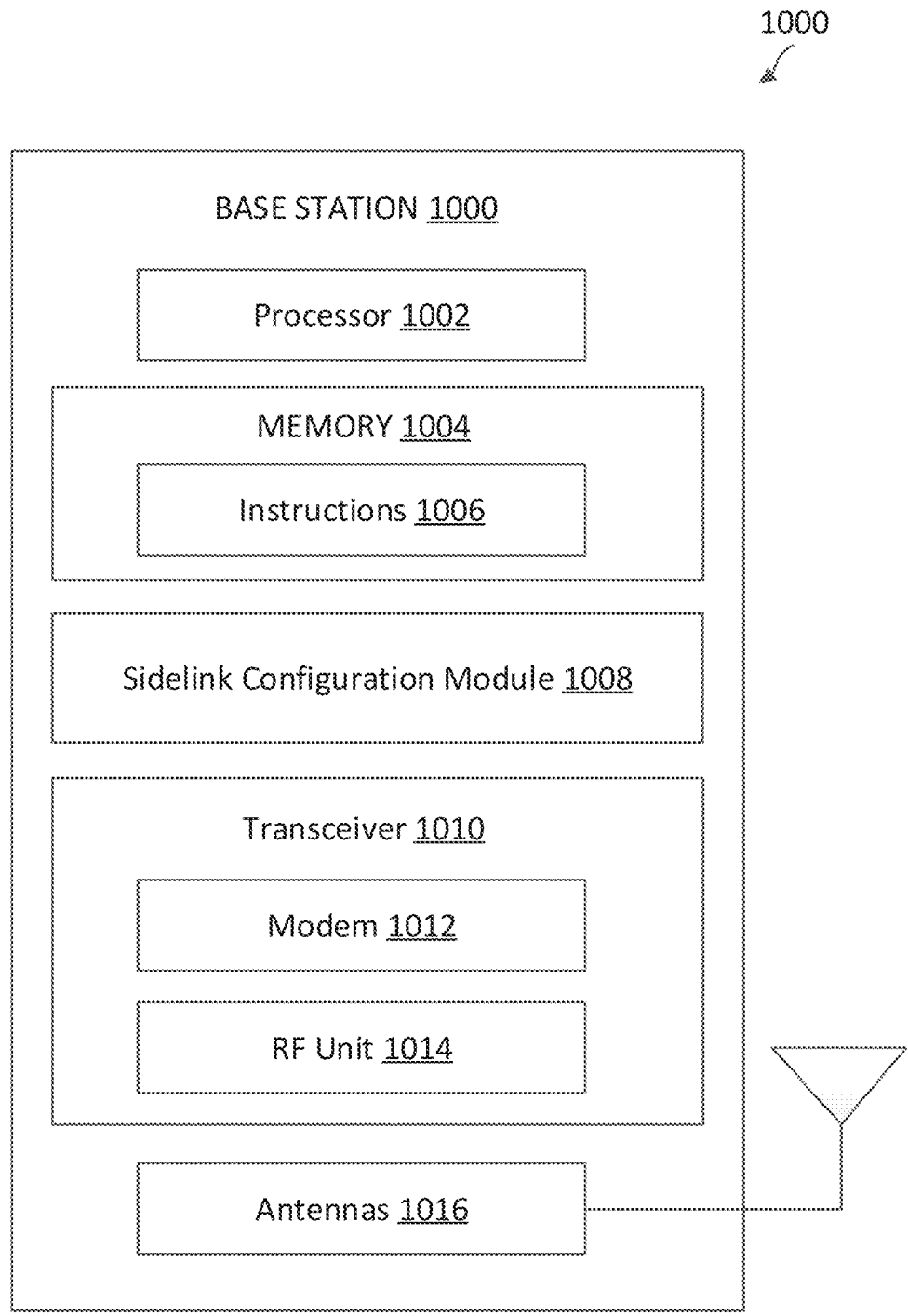
FIG. 10 is a block diagram of a base station (BS) according to some aspects of the present disclosure.

FIG. 10 is a block diagram of an exemplary BS 1000 according to some aspects of the present disclosure. The BS 1000 may be a BS 105 in the network 100 as discussed above in FIG. 1, a BS 205 as discussed above in FIG. 2, a BS 405 as discussed above in FIG. 4, a BS 505 as discussed above in FIG. 5, or a BS 605 as discussed above in FIG. 6. A shown, the BS 1000 may include a processor 1002, a memory 1004, an sidelink configuration module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 2-6, 7A-7B, and 8. Instructions 1006 may also be referred to as program code. The program code may be for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configuration module 1008 may be implemented via hardware, software, or combinations thereof. For example, the sidelink configuration module 1008 may be implemented as a processor, circuit, and/or instructions 1006 stored in the memory 1004 and executed by the processor 1002. In some examples, the sidelink configuration module 1008 can be integrated within the modem subsystem 1012. For example, the sidelink configuration module 1008 can be implemented by a combination of software components (e.g., executed by a DSP or a general processor) and hardware components (e.g., logic gates and circuitry) within the modem subsystem 912.

The sidelink configuration module 1008 may communicate with various components of the BS 1000 to perform various aspects of the present disclosure, for example, aspects of FIGS. 2-6, 7A-7B, and 8. The sidelink configuration module 1008 is configured to configure UEs (e.g., the UEs 115, 215, 415 and/or 515) with sidelink resource pools for sidelink communications. In some aspects, the sidelink configuration module 1008 may configure the UEs with a resource pool (e.g., resource pool 630) as discussed above in relation to FIGS. 2-6, 7A-7B, and 8. In some aspects, the sidelink configuration module 908 may communicate with a relay UE and a remote UE (via the relay UE) as discussed above in relation to FIGS. 2-6, 7A-7B, and 8.

As shown, the transceiver 1010 may include the modem subsystem 1012 and the RF unit 1014. The transceiver 1010 can be configured to communicate bi-directionally with other devices, such as the UEs 115 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., RRC configuration, sidelink resource pools configurations) from the modem subsystem 1012 (on outbound transmissions) or of transmissions originating from another source such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g. data packets (or, more generally, data messages that may contain one or more data packets and other information), to the antennas 916 for transmission to one or more other devices. This may include, for example, transmission of information to complete attachment to a network and communication with a camped UE 115 according to some aspects of the present disclosure. The antennas 1016 may further receive data messages transmitted from other devices and provide the received data messages for processing and/or demodulation at the transceiver 1010. The transceiver 1010 may provide the demodulated and decoded data to the sidelink configuration module 1008 for processing. The antennas 1016 may include multiple antennas of similar or different designs in order to sustain multiple transmission links.

In an aspect, the BS 1000 can include multiple transceivers 1010 implementing different RATs (e.g., NR and LTE). In an aspect, the BS 1000 can include a single transceiver 1010 implementing multiple RATs (e.g., NR and LTE). In an aspect, the transceiver 1010 can include various components, where different combinations of components can implement different RATs.

Figure 11:
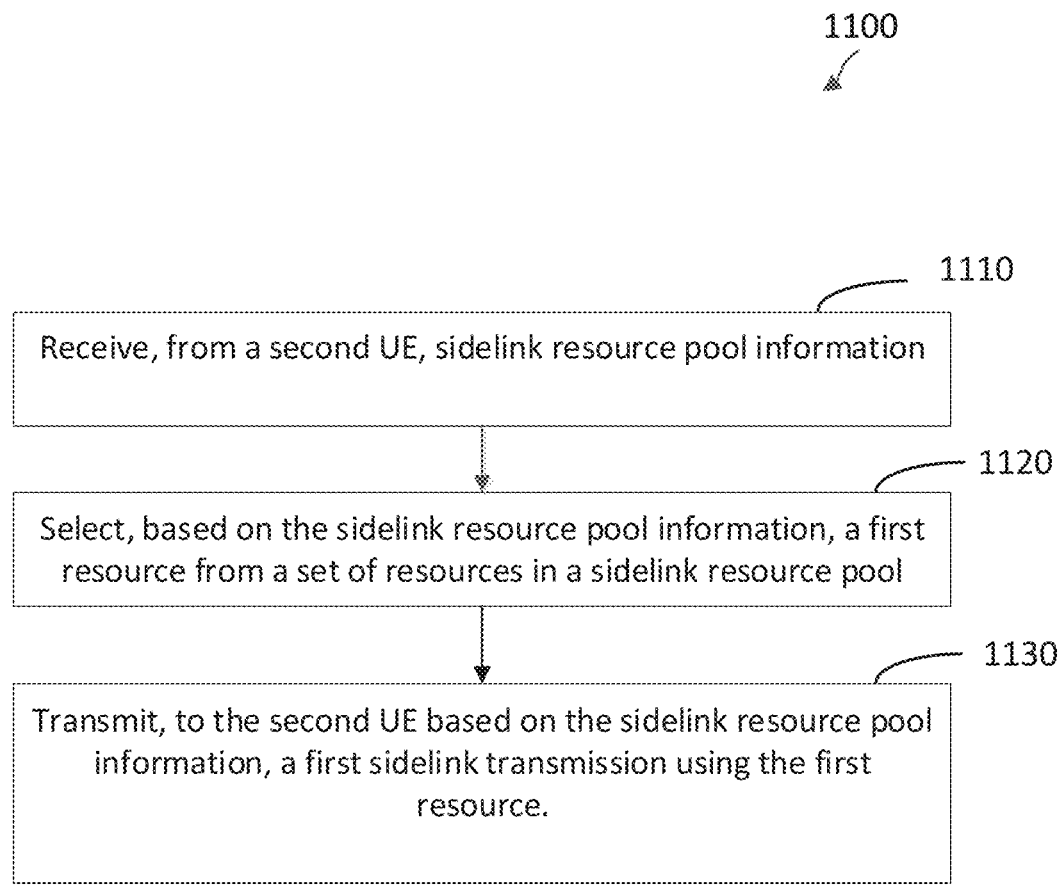
FIG. 11 is a flow diagram of a communication method according to some aspects of the present disclosure.

FIG. 11 is a flow diagram of a sidelink system information broadcasting process 1100 according to some aspects of the present disclosure. Aspects of the process 1100 can be executed by a computing device (e.g., a processor, processing circuit, and/or other suitable component) of a wireless communication device or other suitable means for performing the steps. For example, a wireless communication device, such as the UEs 115, 215, 420, and/or 520, may utilize one or more components, such as the processor 902, the memory 904, the sidelink communication module 908, the transceiver 910, the modem 912, and the one or more antennas 916, to execute the steps of process 1100. The process 1100 may employ, at least in part, similar mechanisms as discussed above with respect to FIGS. 2-6, 7A-7B, and 8. As illustrated, the process 1100 includes a number of enumerated steps, but aspects of the process 1100 may include additional steps before, after, and in between the enumerated steps. In some aspects, one or more of the enumerated steps may be omitted or performed in a different order.

At block 1110, a first UE may receive, from a second UE, sidelink resource pool information. The first UE may be a remote UE similar to the remote UEs 420, 520, and 620, and the second UE may be a relay UE similar to the relay UEs 415, 515, and 615. In some instances, the resource pool may be similar to the resource pool 630 of FIG. 6.

At block 1120, the first UE may select, based on the sidelink resource pool information, a first resource from a set of resources in a sidelink resource pool. In some aspects, the first UE may select the first resource from the set of resources is further based on a random number. In some aspects, the first UE may select the first resource from the set of resources is further based on a UE identifier (ID) associated with the first UE. In some aspects, the first resource may be associated to the reverse link similar to the link 604 of FIG. 6.

At block 1130, the first UE may transmit, to the second UE based on the sidelink resource pool information, a first sidelink transmission using the first resource. In some aspect the first UE may transmit data and control signaling in the first sidelink transmission. In some aspects, the sidelink resource pool information may indicate a TBS, and the first UE may transmit a data block in the first sidelink transmission; the data block length can be equal or less than the TBS. In some aspects, the sidelink resource pool information may indicate an MCS, and the first UE may transmit the first sidelink transmission using an MCS equal or less than the indicated MCS. In some aspects, the sidelink resource may indicate a power control parameter. Accordingly, the first UE may receive a signal from the second UE and estimate a path loss from the received signal power, and adjust its transmission power for the first sidelink transmission using the power control parameter. In some aspects, the sidelink resource pool may indicate a CBR. Accordingly, the first UE may use CBR to determine the availability of frequency bands for the first resource.

In some aspects, the first UE may select a second resource from the set of resource based on a frequency-hopping pattern. In some aspects, the first UE may transmit to the second UE, a second sidelink transmission using the second resource in a different frequency based on the frequency-hopping pattern. In some aspect, the frequency hopping pattern, may be a UE-specific frequency-hopping pattern.

In some aspects, the first UE may transmit, to the second UE, in a physical sidelink share channel (PSSCH) of the first resource, a data block associated with a hybrid automatic repeat request (HARQ) process. In some aspects, the first UE may transmit, to the second UE, in a physical sidelink control channel (PSCCH) of the first resource. The sidelink control information may indicate the second resource. In some aspect the second resource may be associated with a retransmission of the data block.

Figure 12:
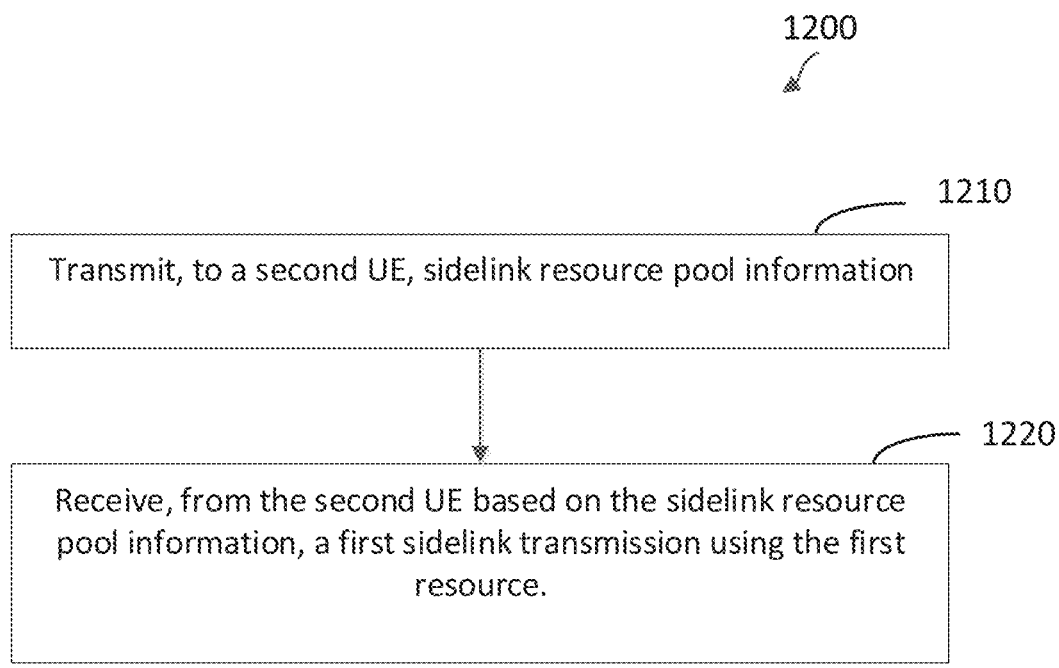
FIG. 12 is a flow diagram of a communication method according to some aspects of the present disclosure.

FIG. 12 is a flow diagram of a sidelink system information broadcasting process 1200 according to some aspects of the present disclosure. Aspects of the process 1200 can be executed by a computing device (e.g., a processor, processing circuit, and/or other suitable component) of a wireless communication device or other suitable means for performing the steps. For example, a wireless communication device, such as the UEs 115, 215, 420, and/or 520, may utilize one or more components, such as the processor 902, the memory 904, the sidelink communication module 908, the transceiver 910, the modem 912, and the one or more antennas 916, to execute the steps of process 1200. The process 1200 may employ, at least in part, similar mechanisms as discussed above with respect to FIGS. 2-6, 7A-7B, and 8. As illustrated, the process 1200 includes a number of enumerated steps, but aspects of the process 1200 may include additional steps before, after, and in between the enumerated steps. In some aspects, one or more of the enumerated steps may be omitted or performed in a different order.

At block 1210, a first UE may transmit, to a second UE, sidelink resource pool information. The first UE may be a relay UE similar to the relay UEs 415, 515, and 615, and the second UE may be a remote UE similar to the remote UEs 420, 520, and 620. In some instances, the resource pool may be similar to the resource pool 630 of FIG. 6.

At block 1220, the first UE may receive, from the second UE based on the sidelink resource pool information, a first sidelink transmission in the first resource. In some aspect the first UE may receive data and control signaling in the first sidelink transmission. In some aspects, the sidelink resource pool information may indicate a TBS, and the first sidelink transmission may include a data block having a data block length (e.g., number of bits) be equal to or less than the TBS. In some aspects, the sidelink resource pool information may indicate an MCS, and the first sidelink transmission may include a data block encoded based on an MCS equal or less than the indicated MCS. In some aspects, the sidelink resource pool information may indicate at least one of a power control parameter, a CBR, and/or a maximum resource utilization. In some aspects, the first UE may receive from the second UE, a second sidelink transmission in a second resource within a different frequency than the first resource based on a frequency hopping pattern. In some aspect, the frequency hopping pattern, may be a UE-specific frequency-hopping pattern.

In some aspects, the first UE may receive, from the second UE, in a physical sidelink share channel (PSSCH) of the first resource, a data block associated with a hybrid automatic repeat request (HARQ) process. In some aspects, the first UE may receive, from the second UE, a physical sidelink control channel (PSCCH) of the first resource. The sidelink control information may indicate the second resource. In some aspect the second resource may be associated with a retransmission of the data block.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

EXAMPLE ASPECTS OF THE PRESENT DISCLOSURE

Aspect 1. A method of wireless communication performed by a first user equipment (UE), the method comprising: receiving, from a second UE, sidelink resource pool information; selecting, based on the sidelink resource pool information, a first resource from a set of resources in a sidelink resource pool; and transmitting, to the second UE based on the sidelink resource pool information, a first sidelink transmission using the first resource.

Aspect 2. The method of aspect 1, wherein the selecting the first resource from the set of resources is further based on a random number.

Aspect 3. The method of any of aspects 1-2, wherein the selecting the first resource from the set of resources is further based on a UE identifier (ID) associated with the first UE.

Aspect 4. The method of any of aspects 1-3, wherein: the sidelink resource pool information indicates a first transport block size; and the transmitting comprises: transmitting the first sidelink transmission including a data block associated with a transport block size equal to or less than the first transport block size.

Aspect 5. The method of any of aspects 1-4, wherein: the sidelink resource pool information indicates a modulation coding scheme (MCS); and the transmitting the first sidelink transmission is based on the MCS.

Aspect 6. The method of any of aspects 1-4, wherein: the sidelink resource pool information indicates a first modulation coding scheme (MCS); and the method further comprises: determining a second MCS having a MCS order equal to or lower than the first MCS; and the transmitting the first sidelink transmission is based on the second MCS.

Aspect 7. The method of any of aspects 1-6, wherein: the sidelink resource pool information indicates a power control parameter; and the transmitting the first sidelink transmission is further based on the power control parameter.

Aspect 8. The method of any of aspects 1-7, wherein: the sidelink resource pool information indicates a parameter associated with a resource utilization in the sidelink resource pool; and the selecting the first resource from the set of resources is based on the parameter associated with the resource utilization in the sidelink resource pool.

Aspect 9. The method of any of aspects 1-8, wherein: the sidelink resource pool information indicates a channel busy ratio (CBR) associated with the sidelink resource pool; and the selecting the first resource from the set of resources is based on the CBR.

Aspect 10. The method of any of aspects 1-9, further comprising: selecting a second resource from the set of resources based on a frequency-hopping pattern; and transmitting, to the second UE, a second sidelink transmission using the second resource.

Aspect 11. The method of aspect 10, wherein the frequency-hopping pattern is a UE-specific frequency-hopping pattern.

Aspect 12. The method of any of aspects 10-11, wherein: the transmitting the first sidelink transmission comprises: transmitting, in a physical sidelink share channel (PSSCH) of the first resource, a data block associated with a hybrid automatic repeat request (HARQ) process; and transmitting, in a physical sidelink control channel (PSCCH) of the first resource, sidelink control information indicating the second resource; and the transmitting the second sidelink transmission comprises: transmitting a retransmission of the data block.

Aspect 13. The method of any of aspects 1-12, wherein the transmitting the first sidelink transmission is based on an open loop power control.

Aspect 14. The method of any of aspects 1-3, further comprising: receiving, from the second UE, a synchronization signal, wherein the transmitting the first sidelink transmission is based on a received power of the synchronization signal.

Aspect 15. The method of any of aspects 1-14, wherein the transmitting the first sidelink transmission is further based on a UE-specific scrambling sequence.

Aspect 16. A method of wireless communication performed by a first user equipment (UE), the method comprising: transmitting, to a second UE, sidelink resource pool information associated with a sidelink resource pool; and receiving, from the second UE based on the sidelink resource pool information, a first sidelink transmission in a first resource of a set of resources in the sidelink resource pool.

Aspect 17. The method of aspect 16, further comprising: determining the first resource from the set of resources is further based a UE identifier (ID) associated with the first UE.

Aspect 18. The method of any of aspects 16-17, wherein the sidelink resource pool information indicates at least one of a transport block size, a modulation coding scheme (MCS), a power control parameter, a parameter associated with a resource utilization in the sidelink resource pool, or a channel busy ratio (CBR) associated with the sidelink resource pool.

Aspect 19. The method of any of aspects 16-18, further comprising: receiving, from the second UE, a second sidelink transmission in a second resource, the second resource being based on a frequency-hopping pattern.

Aspect 20. The method of aspect 19, wherein the frequency-hopping pattern is a UE-specific frequency hopping pattern.

Aspect 21. The method of any of aspects 19-20, wherein: the receiving the first sidelink transmission comprises: receiving, in a physical sidelink share channel (PSSCH) of the first resource, a data block associated with a hybrid automatic repeat request (HARQ) process; and receiving, in a physical sidelink control channel (PSCCH) of the first resource, sidelink control information indicating the second resource; and the receiving the second sidelink transmission comprises: receiving a retransmission of the data block.

Aspect 22. The method of any of aspects 16-21, wherein the receiving the first sidelink transmission is further based on a UE-specific scrambling sequence.

Aspect 23. A first user equipment (UE) comprising: a processor and a transceiver configured to perform the steps of any of aspects 1-15.

Aspect 24. A first user equipment (UE) comprising: a processor and a transceiver configured to perform the steps of any of aspects 16-22.

Aspect 25. A non-transitory computer readable medium having program code recorded on, the program code comprising code for causing a first user equipment (UE) to perform the steps of any of aspects 1-15.

Aspect 26. A non-transitory computer readable medium having program code recorded on, the program code comprising code for causing a first user equipment (UE) to perform the steps of any of aspects 16-22.

Aspect 27. A first user equipment (UE) comprising means for performing the steps of aspects 1-15.

Aspect 28. A first user equipment (UE) comprising means for performing the steps of aspects 16-22.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    receiving, from a second UE, sidelink resource pool information and a synchronization signal;
    selecting, based on the sidelink resource pool information, a first resource from a set of resources in a sidelink resource pool; and
    transmitting, to the second UE based on the sidelink resource pool information and a received power of the synchronization signal, a first sidelink transmission using the first resource.

2. The method of claim 1, wherein the selecting the first resource from the set of resources is further based on a random number.

3. The method of claim 1, wherein the selecting the first resource from the set of resources is further based on a UE identifier (ID) associated with the first UE.

4. The method of claim 1, wherein:
    the sidelink resource pool information indicates a first transport block size; and
    the transmitting comprises:
        transmitting the first sidelink transmission including a data block associated with a transport block size equal to or less than the first transport block size.

5. The method of claim 1, wherein:
    the sidelink resource pool information indicates a modulation coding scheme (MCS); and
    the transmitting the first sidelink transmission is based on the MCS.

6. A method of wireless communication performed by a first user equipment (UE), the method comprising:
    receiving, from a second UE, sidelink resource pool information;
    selecting, based on the sidelink resource pool information, a first resource from a set of resources in a sidelink resource pool, wherein the sidelink resource pool information indicates a first modulation coding scheme (MCS);
    determining a second MCS having a MCS order equal to or lower than the first MCS; and
    transmitting, to the second UE based on the second MCS, a first sidelink transmission using the first resource.

7. The method of claim 1, wherein:
    the sidelink resource pool information indicates a power control parameter; and
    the transmitting the first sidelink transmission is further based on the power control parameter.

8. The method of claim 1, wherein:
    the sidelink resource pool information indicates a parameter associated with a resource utilization in the sidelink resource pool; and
    the selecting the first resource from the set of resources is based on the parameter associated with the resource utilization in the sidelink resource pool.

9. The method of claim 1, wherein:
    the sidelink resource pool information indicates a channel busy ratio (CBR) associated with the sidelink resource pool; and
    the selecting the first resource from the set of resources is based on the CBR.

10. The method of claim 1, further comprising:
    selecting a second resource from the set of resources based on a frequency-hopping pattern; and
    transmitting, to the second UE, a second sidelink transmission using the second resource.

11. The method of claim 10, wherein the frequency-hopping pattern is a UE-specific frequency-hopping pattern.

12. The method of claim 10, wherein:
    the transmitting the first sidelink transmission comprises:
        transmitting, in a physical sidelink share channel (PSSCH) of the first resource, a data block associated with a hybrid automatic repeat request (HARQ) process; and
        transmitting, in a physical sidelink control channel (PSCCH) of the first resource, sidelink control information indicating the second resource; and
    the transmitting the second sidelink transmission comprises:
        transmitting a retransmission of the data block.

13. The method of claim 1, wherein the transmitting the first sidelink transmission is based on an open loop power control.

14. A method of wireless communication performed by a first user equipment (UE), the method comprising:
    receiving, from a second UE, sidelink resource pool information;
    selecting, based on the sidelink resource pool information, a first resource from a set of resources in a sidelink resource pool; and
    transmitting, to the second UE based on the sidelink resource pool information, a first sidelink transmission using the first resource, wherein the transmitting the first sidelink transmission is further based on a UE-specific scrambling sequence.

15. A method of wireless communication performed by a first user equipment (UE), the method comprising:
    transmitting, to a second UE, sidelink resource pool information associated with a sidelink resource pool; and
    receiving, from the second UE based on the sidelink resource pool information and a UE-specific scrambling sequence, a first sidelink transmission in a first resource of a set of resources in the sidelink resource pool.

16. The method of claim 15, further comprising:
determining the first resource from the set of resources is further based a UE identifier (ID) associated with the first UE.

17. The method of claim 15, wherein the sidelink resource pool information indicates at least one of a transport block size, a modulation coding scheme (MCS), a power control parameter, a parameter associated with a resource utilization in the sidelink resource pool, or a channel busy ratio (CBR) associated with the sidelink resource pool.

18. A first user equipment (UE) comprising:
a transceiver;
memory; and
a processor coupled to the transceiver and the memory, and wherein the memory and the processor are configured to cause the first UE to:
receive, from a second UE via the transceiver, sidelink resource pool information and a synchronization signal;
select, based on sidelink resource pool information, a first resource from a set of resources in a sidelink resource pool; and
transmit, to the second UE via the transceiver based on the sidelink resource pool information and a received power of the synchronization signal, a first sidelink transmission using the first resource.

19. The first UE of claim 18, wherein:
the sidelink resource pool information indicates a first transport block size; and
the first sidelink transmission includes a data block associated with a transport block size equal to or less than the first transport block size.

20. The first UE of claim 18, wherein:
the sidelink resource pool information indicates a modulation coding scheme (MCS); and
the first sidelink transmission is based, at least in part, on the MCS.

21. The first UE of claim 18, wherein:
the sidelink resource pool information indicates a first modulation coding scheme (MCS); and
the memory and the processor are further configured to cause the first UE to:
determine a second MCS having a MCS order equal to or lower than the first MCS; and
wherein the first sidelink transmission is based, at least in part, on the second MCS.

22. The first UE of claim 18, wherein:
the sidelink resource pool information indicates a power control parameter; and
the first sidelink transmission is based, at least in part, on the power control parameter.

23. A first user equipment (UE) comprising:
a transceiver;
memory; and
a processor coupled to the transceiver and the memory, and wherein the memory and the processor are configured to cause the first UE to:
transmit, to a second UE via the transceiver, sidelink resource pool information associated with a sidelink resource pool; and
receive, via the transceiver from the second UE based on the sidelink resource pool information and a UE-specific scrambling sequence, a first sidelink transmission in a first resource of a set of resources in the sidelink resource pool.

24. The first UE of claim 23, wherein the memory and processor are further configured to cause the first UE to:
receive, from the second UE via the transceiver, a second sidelink transmission in a second resource, the second resource being based on a frequency-hopping pattern.

* * * * *